(12) United States Patent
Schuit et al.

(10) Patent No.: US 11,251,743 B2
(45) Date of Patent: Feb. 15, 2022

(54) CLICK-ON TOWER AND L-FOOT MOUNT FOR ATTACHING SOLAR PANELS TO A ROOF

(71) Applicant: Unirac Inc., Albuquerque, NM (US)

(72) Inventors: Nathan Schuit, Albuquerque, NM (US); Jason Mayfield, Albuquerque, NM (US)

(73) Assignee: Unirac Inc., Albuquerque, NM (US)

( * ) Notice: Subject to any disclaimer, the term of this patent is extended or adjusted under 35 U.S.C. 154(b) by 239 days.

(21) Appl. No.: 15/659,038

(22) Filed: Jul. 25, 2017

(65) Prior Publication Data

US 2019/0036474 A1  Jan. 31, 2019

(51) Int. Cl.
| | |
|---|---|
| H02S 20/00 | (2014.01) |
| H02S 30/00 | (2014.01) |
| F16B 5/06 | (2006.01) |
| H02S 20/23 | (2014.01) |
| H02S 20/30 | (2014.01) |
| F16B 5/02 | (2006.01) |

(52) U.S. Cl.
CPC .............. *H02S 20/23* (2014.12); *H02S 20/30* (2014.12); *H02S 30/00* (2013.01); *F16B 5/02* (2013.01); *F16B 5/06* (2013.01); *F16B 5/065* (2013.01)

(58) Field of Classification Search
CPC .... F16B 5/06; F16B 2/12; F16B 5/065; F16B 5/02; F16M 13/02; F16M 2200/08; F16J 15/022; H02S 20/23; H02S 20/30; H02S 30/00; Y02B 10/10; Y02E 10/50
USPC ......... 52/173.3; 136/244; 126/622, 623, 621
See application file for complete search history.

(56) References Cited

U.S. PATENT DOCUMENTS

| | | | | |
|---|---|---|---|---|
| 741,747 | A | * 10/1903 | Walz | ................... E04D 13/1476 52/173.3 |
| 1,473,504 | A | 11/1923 | Neely | |
| 3,124,330 | A | * 3/1964 | Robinson | .................. E04G 7/26 248/228.2 |
| 4,575,295 | A | * 3/1986 | Rebentisch | ........... F16B 37/046 411/427 |
| 6,032,939 | A | * 3/2000 | Chen | ....................... B25B 1/103 269/249 |
| 6,220,804 | B1 | * 4/2001 | Pamer | ................... F16B 37/068 29/432.2 |

(Continued)

FOREIGN PATENT DOCUMENTS

WO    WO2017023923    2/2017

OTHER PUBLICATIONS

PCT Search Report for corresponding PCT International Application No. PCT/US2018/032272 dated Jul. 19, 2018, 10 pages.

*Primary Examiner* — Phi D A
(74) *Attorney, Agent, or Firm* — Lee & Hayes, P.C.

(57) ABSTRACT

A click-on clamping mechanism is for attaching, without tools, a clamp+tower subassembly to a slider bar (which is attached to a roof substrate with lag screws). The clamp+ tower sub-assembly can have a height-adjustable, rail-less solar panel mounting assembly attached to it for mounting one or more photovoltaic solar panels thereto. The height of the solar panel mounting assembly can be easily adjusted, either before or after mounting of the solar panels. The click-on clamp+tower sub-assembly is easily removable from the slider bar. A click-on L-foot mount for attaching solar mount rails is also described. The click-on structures can be spring-loaded.

34 Claims, 26 Drawing Sheets

(56) References Cited

U.S. PATENT DOCUMENTS

| | | | | |
|---|---|---|---|---|
| 7,592,537 | B1* | 9/2009 | West | F24S 25/67 |
| | | | | 136/251 |
| 8,070,119 | B2* | 12/2011 | Taylor | E04G 21/3261 |
| | | | | 248/237 |
| 8,091,847 | B2 | 1/2012 | Schnitzer | |
| 8,250,829 | B2* | 8/2012 | McPheeters | E04D 13/1476 |
| | | | | 52/710 |
| 8,651,786 | B2* | 2/2014 | Merhar | F16B 37/046 |
| | | | | 411/84 |
| 8,806,815 | B1* | 8/2014 | Liu | H02S 20/23 |
| | | | | 52/173.3 |
| 8,839,575 | B1* | 9/2014 | Liu | H02S 20/23 |
| | | | | 52/173.3 |
| 8,936,224 | B2 | 1/2015 | Bartelt-Muszynski et al. | |
| 8,984,818 | B2 | 3/2015 | McPheeters et al. | |
| 9,057,542 | B2 | 6/2015 | Schuit et al. | |
| 9,147,986 | B2 | 9/2015 | Redel | |
| 9,175,878 | B2* | 11/2015 | Kemmer | F24S 25/61 |
| 9,225,286 | B1 | 12/2015 | Tweedie | |
| 9,431,953 | B2* | 8/2016 | Stearns | F16M 13/02 |
| D800,544 | S * | 10/2017 | Schuit | D8/397 |
| 9,850,661 | B2* | 12/2017 | Kovacs | E04D 13/10 |
| 9,941,835 | B2* | 4/2018 | Molina | F24S 25/636 |
| 10,205,418 | B2* | 2/2019 | Nayar | F24S 25/634 |
| 2005/0072252 | A1 | 4/2005 | Kumar et al. | |
| 2009/0200443 | A1* | 8/2009 | Burtscher | F24S 25/636 |
| | | | | 248/316.1 |
| 2011/0174947 | A1 | 7/2011 | Wu | |
| 2012/0009009 | A1* | 1/2012 | Bub | F16B 41/002 |
| | | | | 403/204 |
| 2012/0248271 | A1* | 10/2012 | Zeilenga | H02S 20/00 |
| | | | | 248/231.41 |
| 2013/0140807 | A1 | 6/2013 | Van Dusen | |
| 2014/0179133 | A1 | 6/2014 | Redel | |
| 2014/0202525 | A1* | 7/2014 | Janssens | H02S 20/23 |
| | | | | 136/251 |
| 2014/0252288 | A1* | 9/2014 | Stearns | H02S 40/12 |
| | | | | 256/12.5 |
| 2016/0043687 | A1 | 2/2016 | McPheeters et al. | |
| 2016/0352283 | A1 | 12/2016 | Stearns et al. | |
| 2017/0040928 | A1 | 2/2017 | Schuit et al. | |

* cited by examiner

Sec. A-A

CLICK-ON TOWER AND L-FOOT MOUNT FOR ATTACHING SOLAR PANELS TO A ROOF

BACKGROUND OF THE INVENTION

Field of the Invention

This invention pertains to structures and methods for mounting photovoltaic solar panels on roofs.

Introduction and Related Art

Rail-less solar panel mounting structures are well known. Preferred designs have height-adjustable mechanisms that permit the height above the roof to be adjusted either before, or after, the solar panels have been mounted.

As the installation costs of solar panels on residential homes continues to go down, one way to reduce cost is to make it easier and faster to install mounting components on the roof. Costs can also be reduced by minimizing the use of installer tools (e.g., wrenches). This can be accomplished by using structures that are self-attaching, such as structures that have hooks or protrusions that elastically latch or hook on to a substrate without the use of any tools to tighten screws or bolts. In that sense, such structures "click-on" or "snap-on" to the substrate, generally making an audible "click" or "snap" sound when engaged.

U.S. Pat. No. 8,250,829 to McPheeters et al, "Module Attachment Apparatus", describes a symmetric channel nut with a pair of notched flanges that snap into a corresponding pair of recesses in a symmetric rail (which is a tool-less installation). Once clicked into position, the channel nut can't fall out, but it can slide along the rail. In this sense, the click-fit action is a one-way action; the channel nut can't easily be removed once installed.

U.S. Pat. No. 8,984,818 to McPheeters et al, "Snap-In Mounting Systems for Laminate Solar Panels", describes a laminate solar panel with two extended portions (i.e., hooks) with distal ends that each have a notch that clicks/snaps into corresponding sidewalls that couple to the pair of hooks. In this sense, the snap-fit action is a one-way, permanent action; the laminate solar panel can't easily be removed once installed.

U.S. Pat. No. 9,147,986 to Redel, "Fastening System for Mounting Solar Modules", describes an attachment system comprising: (1) a symmetric profile rail comprising: $1^{st}$ and $2^{nd}$ receiving spaces, $3^{rd}$ receiving spaces in the form of a T-Slot, and two webs each having a crank facing inwards; and (2) a symmetric clip holder comprising a head plate having a threaded hole, two legs, and two hooks, wherein the clip holders are inserted into the $3^{rd}$ receiving space of the rail, and the hooks engage the cranks. This assembly technique is permanent and not easily reversed.

U.S. Pat. No. 9,057,542 to Schuit et al., "Snap-On Structural Connector", describes a solar panel attachment system comprising: (1) a symmetric rail comprising a $1^{st}$ and 2nd sidewall with recesses, and structural support in the middle; and (2) a symmetric structural member that is received (hooks/snaps) into the first and second recessed of the connector, with a solar panel being mounted on the structural member. The structural member can slide along the rail once installed, but can't be pulled out. This assembly technique is permanent and not easily reversed.

U.S. Pat. No. 8,936,224 to Bartlet-Muszynski, et al., "Mounting System, Especially for Solar Modules" describes an attachment system comprising: (1) a rail (girder) with symmetric spaced-apart longitudinal grooves, and (2) claw-type solar module fastening means comprising a shaped clamping part with a bore for receiving a fastening bolt and an elastic click-on connection comprising clawing-in of each claw end on the grooves; and a roof hook for connecting to the rail (girder).

U.S. Pat. No. 9,225,286 to Tweedie, "Micro-Inverter Quick Mount and Trunk Cable" describes an attachment system comprising a hook at one end and a snap latch at the other end for releasably attaching a micro-inverter to the back of a solar panel.

U.S. Pat. No. 8,091,847 to Schnitzer, "Connectable Profiled Mounting Rail (Base Rail)" describes a connectable profiled mounting rail comprising: (1) a pair of rectangular mounting rails, one rotated 180° from the other, and (2) longitudinal interlocking (form-fitting) webs for slidably connecting the pair of rails together.

US Patent application 2014/0179133 to Redel, "Fastening System for Mounting Solar Modules" describes a clip holder comprising: a head plate having a threaded hole, and two legs disposed on the head plate with a pair of hooks designed to engage a corresponding pair of cranks.

Against this background, the present invention was developed.

SUMMARY OF THE INVENTION

A click-on clamping mechanism for attaching, without tools, a clamp+tower subassembly to a slider bar (which is attached to a roof substrate with lag screws). The clamp+tower sub-assembly can have a height-adjustable, rail-less solar panel mounting assembly attached to it for mounting one or more photovoltaic solar panels thereto. The height of the solar panel mounting assembly can be easily adjusted either before, or after, mounting of the solar panels. The click-on clamp+tower sub-assembly is easily removable from the slider bar. A click-on L-foot mount for attaching solar mount rails is also described. The click-on structures can be spring-loaded.

BRIEF DESCRIPTION OF THE SEVERAL VIEWS OF THE DRAWING(S)

FIG. 1-A shows an elevation view of an example of a click-on height-adjustable mounting assembly in a skewed position hooked onto a slider, according to the present invention.

FIG. 1-B shows an elevation view of an example of a click-on tower sub-assembly in an attached position on a slider, according to the present invention.

FIG. 1-C shows an elevation view of an example of a click-on tower sub-assembly in a clamped and locked position on a slider, according to the present invention.

FIG. 1-D shows a zoomed-in elevation view of an example of a click-on tower sub-assembly in an attached position on a slider, according to the present invention.

FIG. 2-A shows an elevation view of another example of a click-on tower sub-assembly in a skewed position next to a slider, according to the present invention.

FIG. 2-B shows an elevation view of another example of a click-on tower sub-assembly in an attached position on a slider, according to the present invention.

DETAILED DESCRIPTION OF THE INVENTION

Figure 1A:
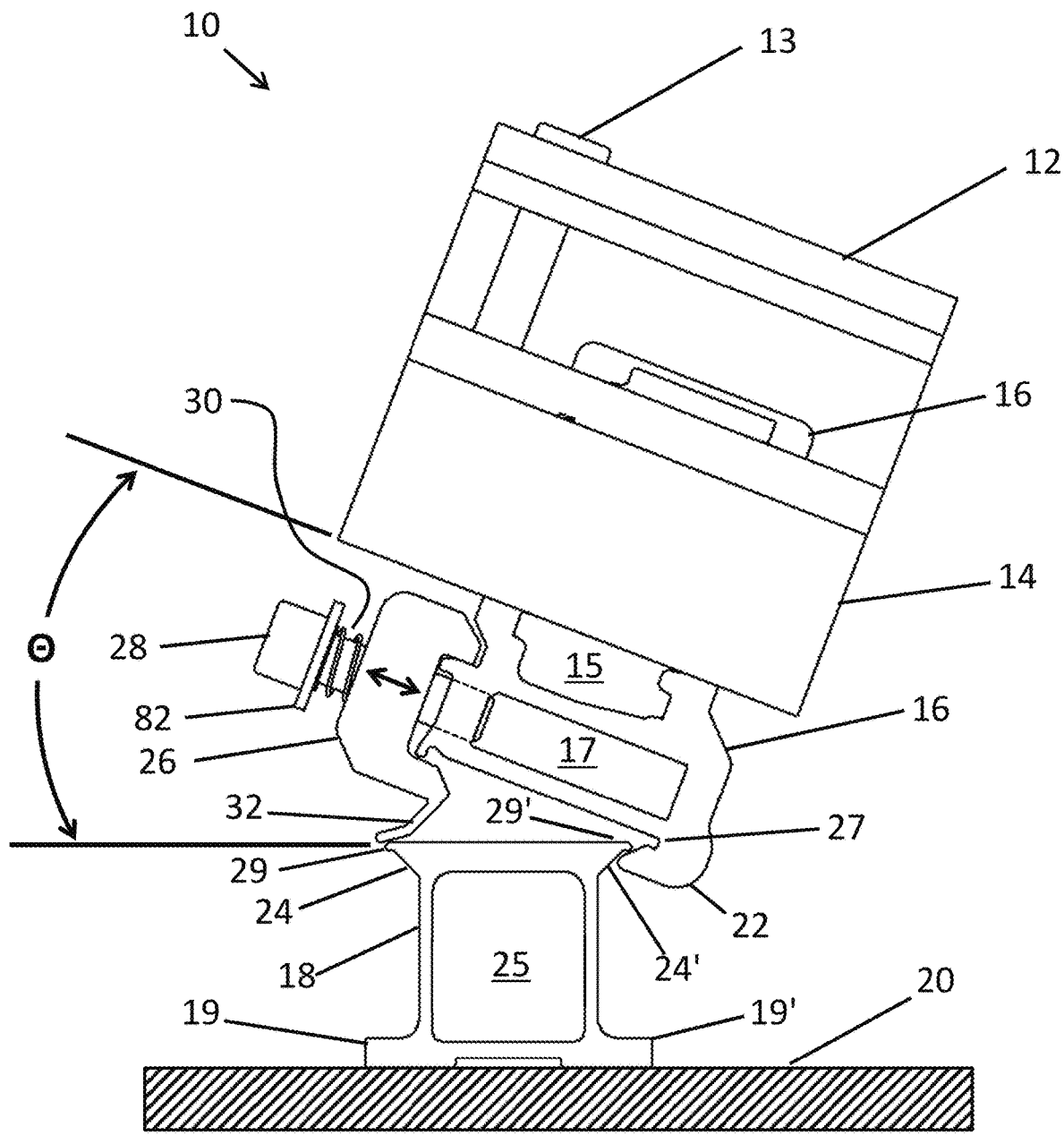
Figure 1B:
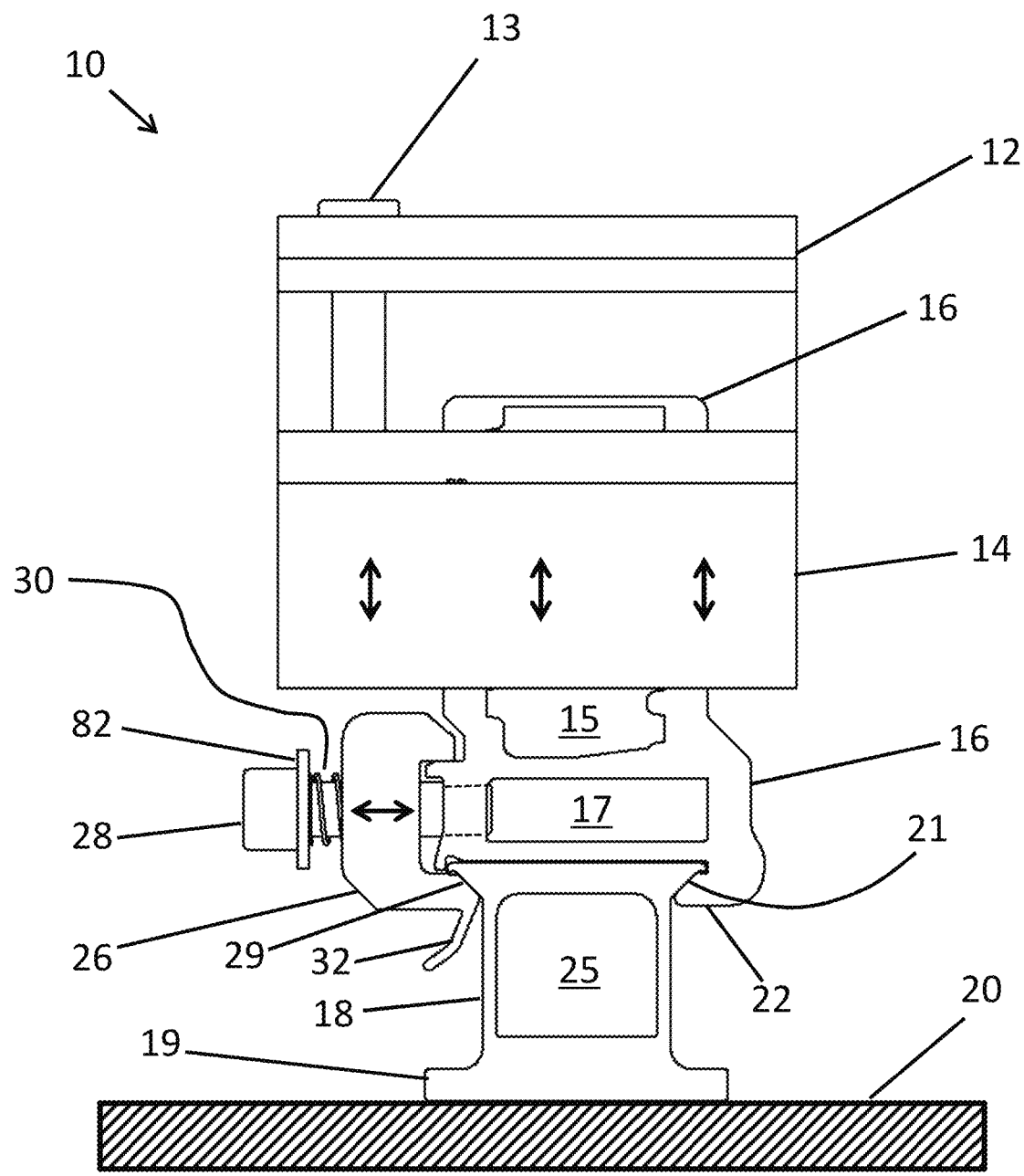
Figure 1C:
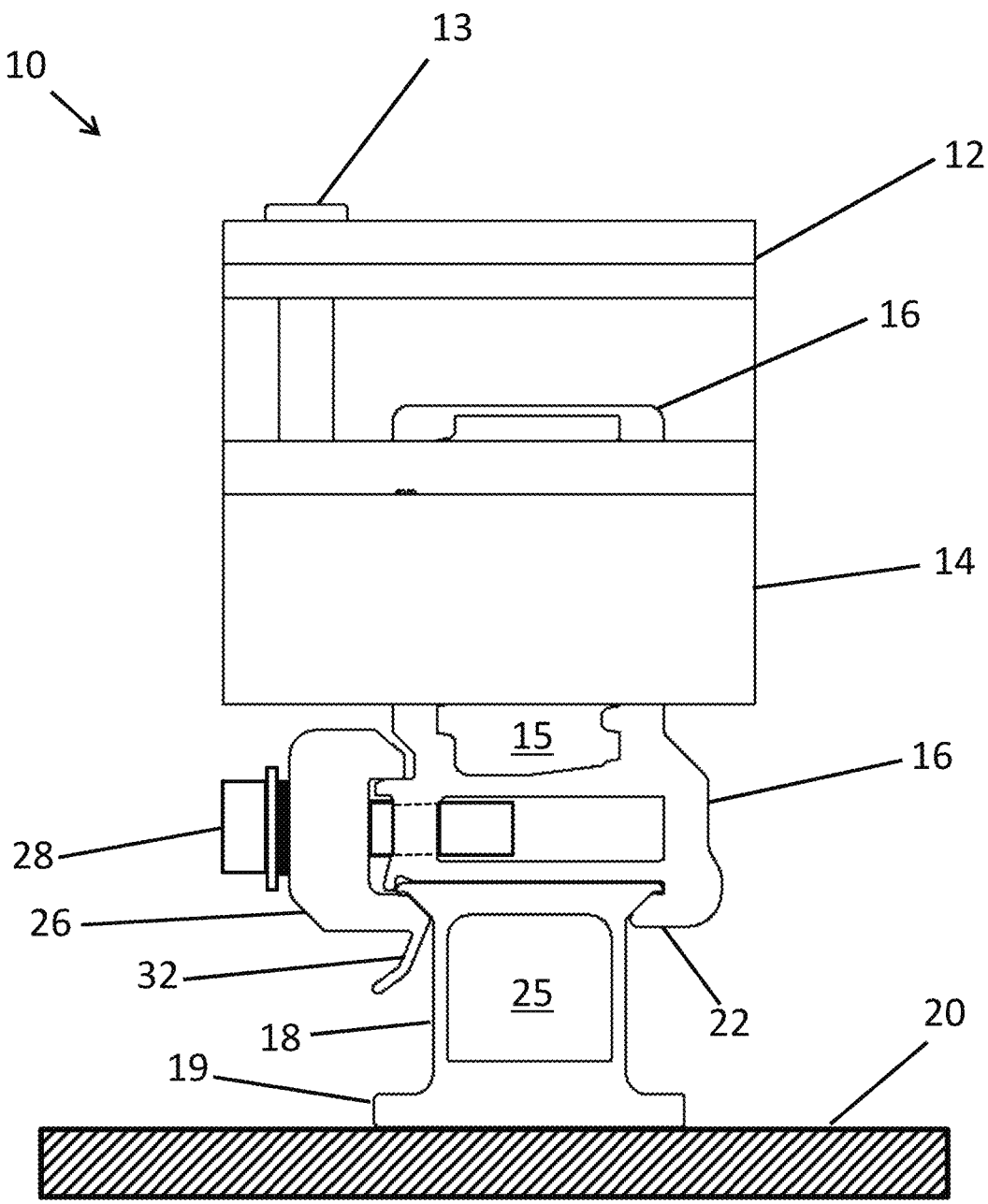
Figure 1D:
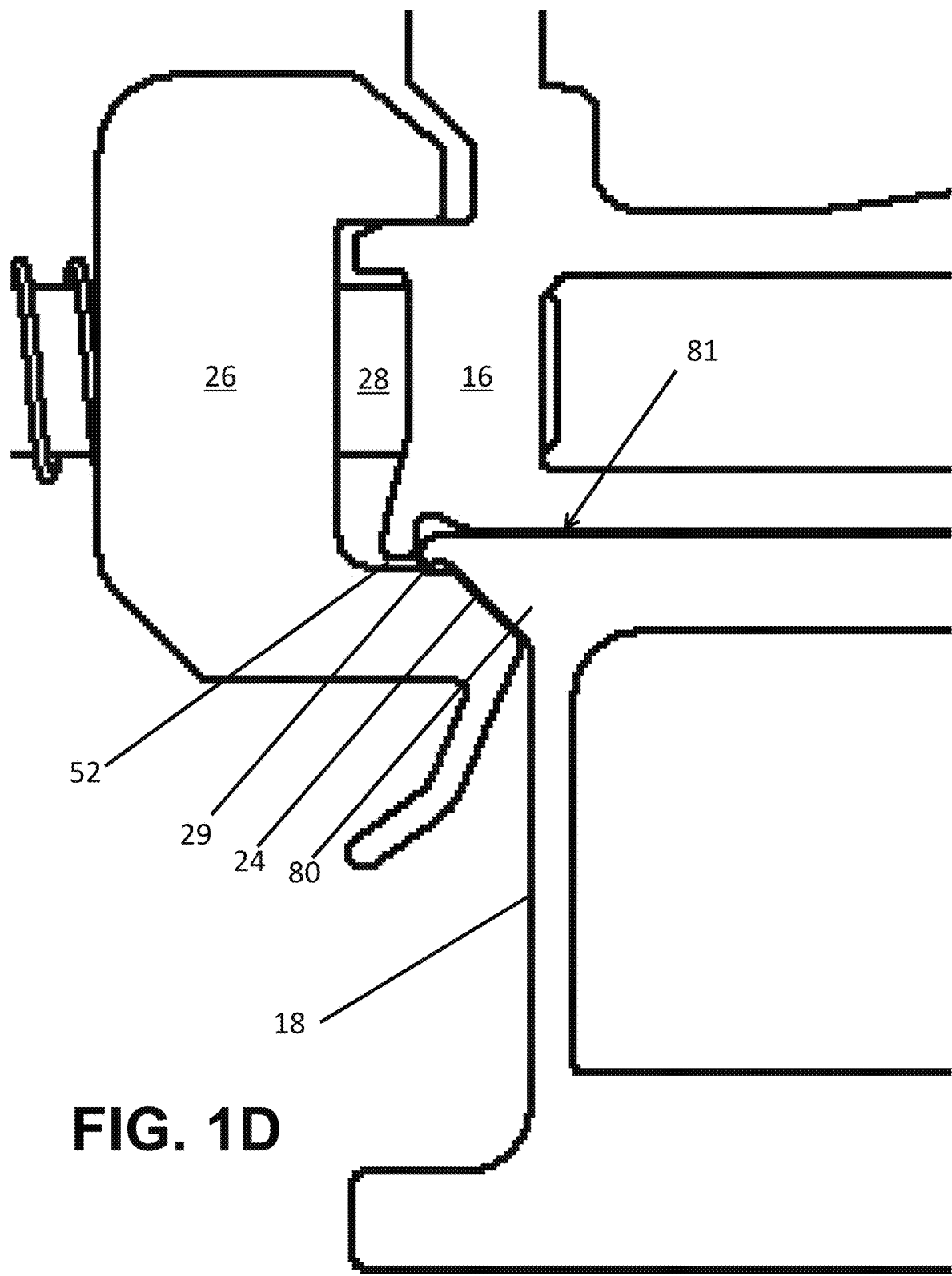

The present invention relates to structures and methods for mounting photovoltaic solar panels on roofs or other structures, and, in particular, to rail-less mounting structures whose height can be adjusted before, or after, the solar panels have been mounted. The present invention also relates to L-foot mounts for attaching rails that solar panels can be attached to. Note: the term "extrusion" broadly means any part that has the shape of an extruded part, meaning that sidewalls are parallel to a longitudinal axis. An "extrusion" can be any part that is made by extruding a part through a die; or it can mean any part that is made by conventional machining (e.g., including, but not limited to, electro discharge machining (EDM)); or made by direct 3-D additive printing.

The present invention comprises an asymmetric tower (stanchion) with a clamp that is urged (biased) towards the center of the tower. This latching clamp allows the clamp+tower sub-assembly to be "clicked-on" (i.e., latched) to a rigid bar (called a "slider bar", or simply "slider") that is lag screwed to a roof or other support substrate. The tower, with a hook on one side, is mounted on the slider in a three-step process. First, the tower is hooked-on to one side of the slider by engaging the hook with a first lip of the slider. Then, in step 2, the tower is rotated down and then "clicked-on" to the slider by automatically pushing (sliding) the clamp outwards sufficiently far so as to clear the opposite (second) lip of the slider. Once the tower has been "clicked-on" and loosely attached to the slider (held, for example, by a spring force, and the tower attached by the action of interlocking surfaces), the tower can be easily slid by hand along the length of the slider to adjust its position North/South along the slider. The clamp's bias mechanism (which can be a coil spring, for example) provides sufficient force, and the design of the interlocking surfaces of the clamp+tower/slider assembly, is sufficiently strong so as to make the assembly substantially resistant to accidental release (such as accidental contact with an installer's foot, ropes hanging on the roof, etc.). Finally, in step 3, the clamp's fastener is tightened (torqued) tight, which permanently locks the tower onto the slider bar. Note: the tower itself can be coupled (attached) to any type of solar panel mounting structure or mechanism that is capable of holding (mounting) one or more solar panels. In particular, such a solar panel mounting structure can comprise a height-adjustable mechanism, which can be adjusted with a tool before or after the solar panels have been mounted. Note: the clamp+tower sub-assembly can be easily removed by releasing the clamp fastener (bolt), and then simply pulling back on the biased clamp and rotating the clamp+tower subassembly back off of the slider, and finally disengaging the tower's hook from the slider.

FIG. 1-A shows an elevation view of an example of a click-on height-adjustable solar panel mounting assembly 10 in an initially skewed position ($\theta=20°$, for example), where tower 16 is hooked onto slider 18, according to the present invention. Here, asymmetric tower (stanchion) 16 has been hooked onto slider bar 18 by engaging notch 27 of tower hook 22 with slider lip 29' of angled (tapered/slanted) slider flange 24'. Tapered (slanted) flanges 24 and 24' can have angled faces oriented at, for example, 45° to the horizontal. In this skewed position of FIG. 1A, the lower flange 32 of clamp 26 is resting on top of the upper surface of slider 18, and clamp fastener 28 is in a backed-out (not-tightened) position, where clamp 26 is free to slide (translate) back and forth along fastener 28, urged forward by spring 30. In this example, upper solar panel mounting bracket 12 and lower solar panel mounting bracket 14 are attached to tower 16. Solar panel fastener 13 will be used to compress upper bracket 12 and lower bracket 14 together so as to mount and securely hold one or more solar panels (not shown) to tower 16 at a later stage in the installation process. Alternatively, the upper and lower brackets 12, 14 are made of a single, monolithic part, in which case the use of a solar panel fastener 13 can be eliminated. FIG. 1-A also illustrates open volumes 15 and 17, a roof surface 20, a hollow volume 25, and a flat washer 82, all of which are further mentioned below.

FIG. 1-B shows an elevation view of an example of the click-on tower assembly 10 in an attached position on slider 18, according to the present invention. When the tower assembly 10 is rotated towards the horizontal position, clamp 26 is pushed back (outwards) by sliding of angled lower flange 32 against left lip 29 of slider 18 (thereby compressing spring 30) to increase the clearance around the slider lip 29. Then, mounting assembly 10 is rotated to the horizontal position (θ=0°), whereupon the lower flange 32 clears the left lip 29 and clamp 26 is released, which causes clamp 26 to snap back into a latched position by action of spring 30. This action causes an audible "clicking" sound when clamp 26 forcefully contacts angled face 24 of slider 18. Spring 30 (which can be a coil spring, stacked Bellevue washers, angled tab(s), leaf spring, elastic band, or any other elastic means for biasing/urging) has sufficient strength so that the clicked-on (attached) assembly 10 can withstand gravity loads and minor installation forces (such as interference with safety ropes), and be substantially resistant to accidental release. Flat washer 82 is placed between spring 30 and the head of fastener 28. Additionally indicated in FIG. 1B are the open volumes 15 and 17, the roof surface 20, and the hollow volume 25.

FIG. 1-C shows an elevation view of an example of a click-on tower assembly 10 in a clamped and locked position on slider 18, according to the present invention. Here, clamp fastener 28 has been tightened and torqued to a level of torque sufficient to securely and permanently clamp (attach) tower 16 to slider 18. Note that the angle of mating surface 21 (See FIG. 11) of hook 22 matches the corresponding angle of the right side mating surface 24' of slider 18; and note that the angle of mating surface or slanted face 60 of clamp 26 (See FIG. 14) matches the corresponding angle of left side mating surface 24 of slider 18. Both of these two angles can be 45°, for example. Clamp fastener 28 can be a cap-headed bolt (e.g., cap screw) with a hexagonal socket drive. Fastener 28 can also have an unthreaded (smooth) proximal portion near the cap-head end, to make it easier for clamp 26 to slide on bolt 28 during installation. Note that initial installation (i.e., clicking-on) of the clamp+tower sub-assembly onto slider 18 in FIGS. 1A and 1B is a tool-less operation that doesn't require any tools to accomplish. In fact, pulling back of clamp 26 by hand is not necessary because clamp 26 automatically retracts and slides when the sub-assembly is hooked-on and rotated down into the horizontal position. Note: slider 18 comprises a pair of bottom flanges 19, 19' that run the length of the slider. The open volume 15, the roof surface 20, and the hollow volume 25 are also indicated in FIG. 1-C.

FIG. 1-D shows a zoomed-in elevation view of an example of a click-on tower sub-assembly in an attached position on a slider, according to the present invention. In this enlarged view, details of the clamp joint can be seen. In particular, the lower left corner of tower 16 comprises a small protrusion (alignment lip) 52 which sticks out below the lower surface 81 of tower 16. When tower 16 is loosely attached to slider 18 via spring-loaded clamp 26, the purpose of lip 52 is to provide good alignment of tower 16 relative to slider 18, and to prevent rotation out-of-plane of tower 16 relative to slider 18, before fastener 28 can be tightened tight. The tapered or slanted slider flange 24, the slider lip 29, and a flange 80 to be discussed later are also indicated in FIG. 1-D.

Figure 2A:
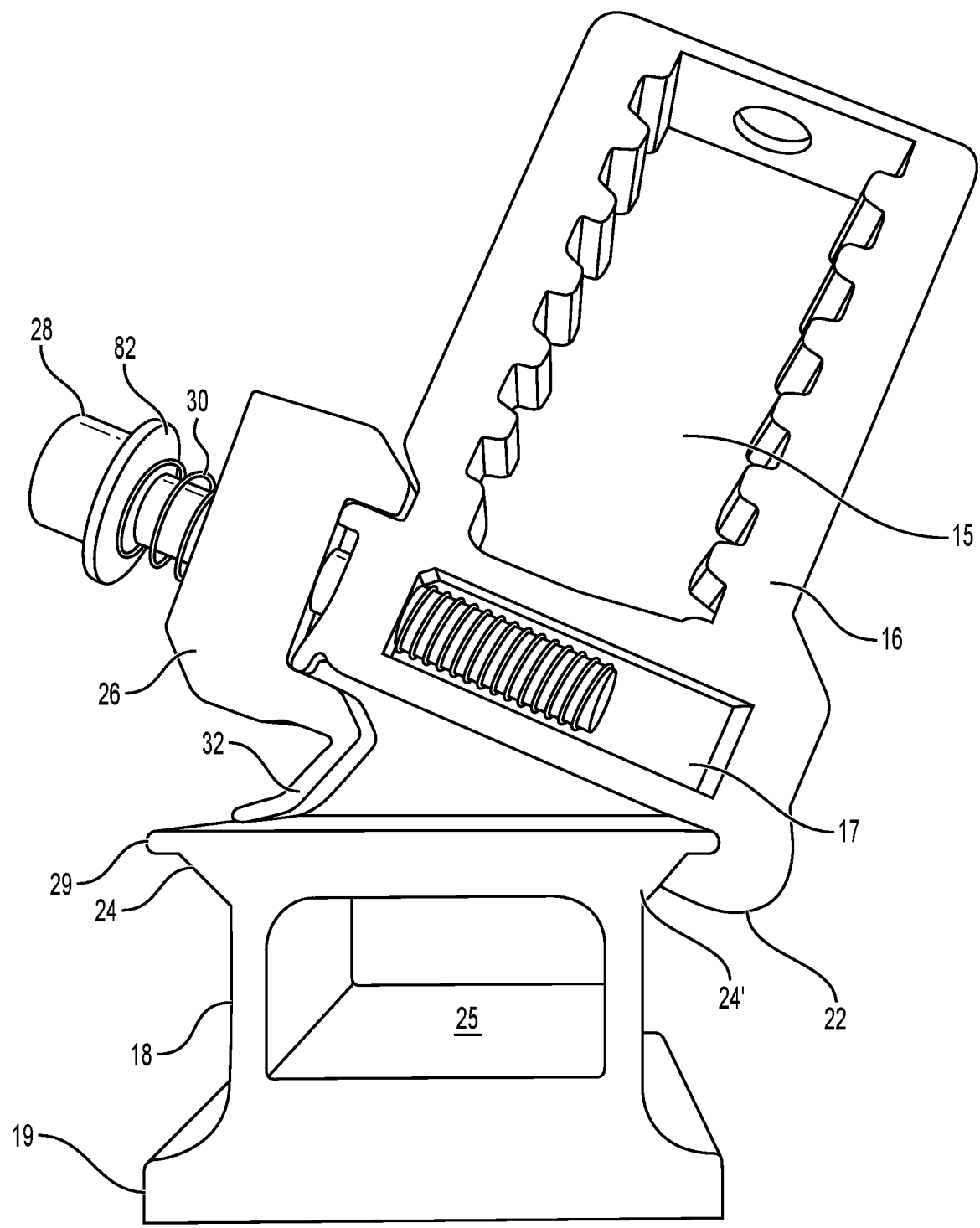
Figure 2B:
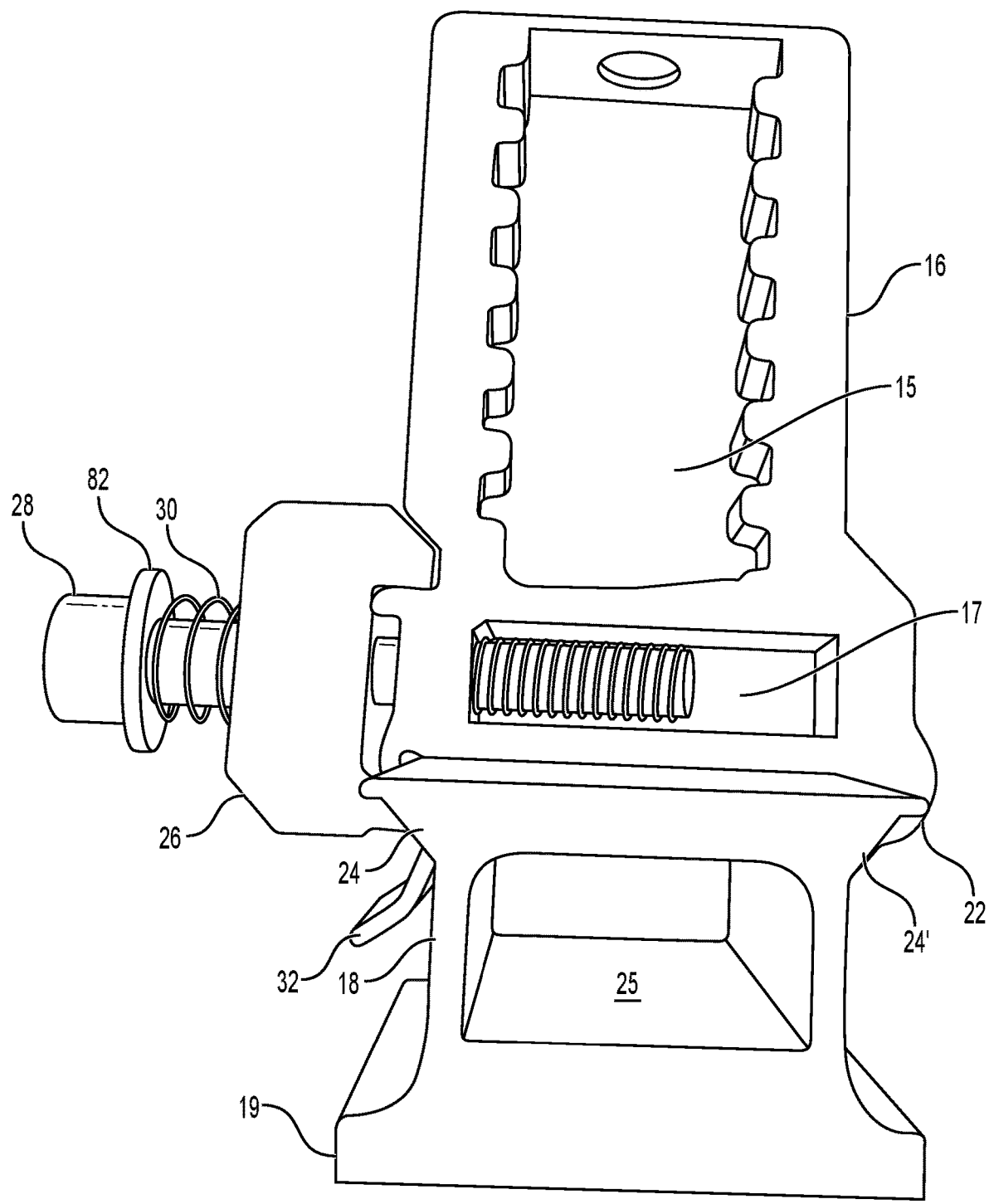

FIG. 2-A shows an elevation view of another example of a click-on tower sub-assembly in a skewed position next to a slider, according to the present invention. Slider 18, tower 16, and clamp 26 can be made as machined or extruded items, and can be made from aluminum or aluminum alloys (which can be anodized black). The open volumes 15 and 17, one bottom flange 19, the tower hook 22, the flanges 24, 24', the hollow volume 25, the clamp fastener 28, the lip 29, the spring 30, the lower flange 32 of the clamp 26, and the flat washer 82 are also indicated in FIG. 2-A.

FIG. 2-B shows an elevation view of another example of a click-on tower assembly in an attached position on a slider, according to the present invention. The open volumes 15 and 17, the tower 16, the slider 18, one bottom flange 19, the tower hook 22, the tapered or slanted flanges 24, 24', the hollow volume 25, the clamp 26, the bolt 28, the spring 30, the lower flange 32, and the flat washer 82 are also indicated in FIG. 2-B.

Figure 3:
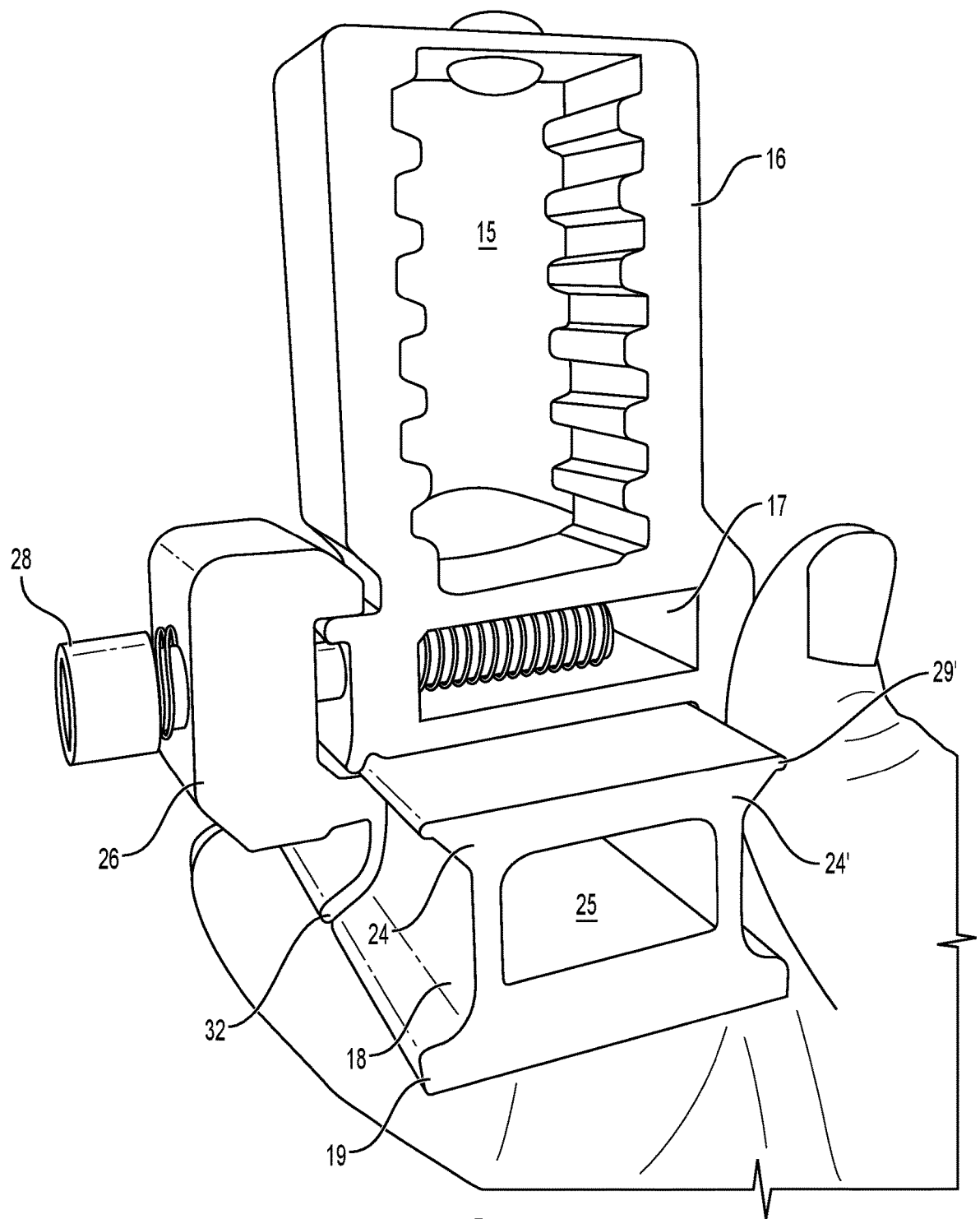
FIG. 3 shows a perspective view of another example of a click-on tower sub-assembly attached to a slider, according to the present invention.

FIG. 3 shows a perspective view of another example of a click-on tower sub-assembly attached to a slider, according to the present invention. This example is made of 3-D printed plastic. The open volumes 15 and 17, the tower 16, the slider 18, one bottom flange 19, the flanges 24, 24', the hollow volume 25, the clamp 26, the bolt 28, one lip 29', and the lower flange 32 of the printed plastic sub-assembly are indicated in FIG. 3.

Figure 4:
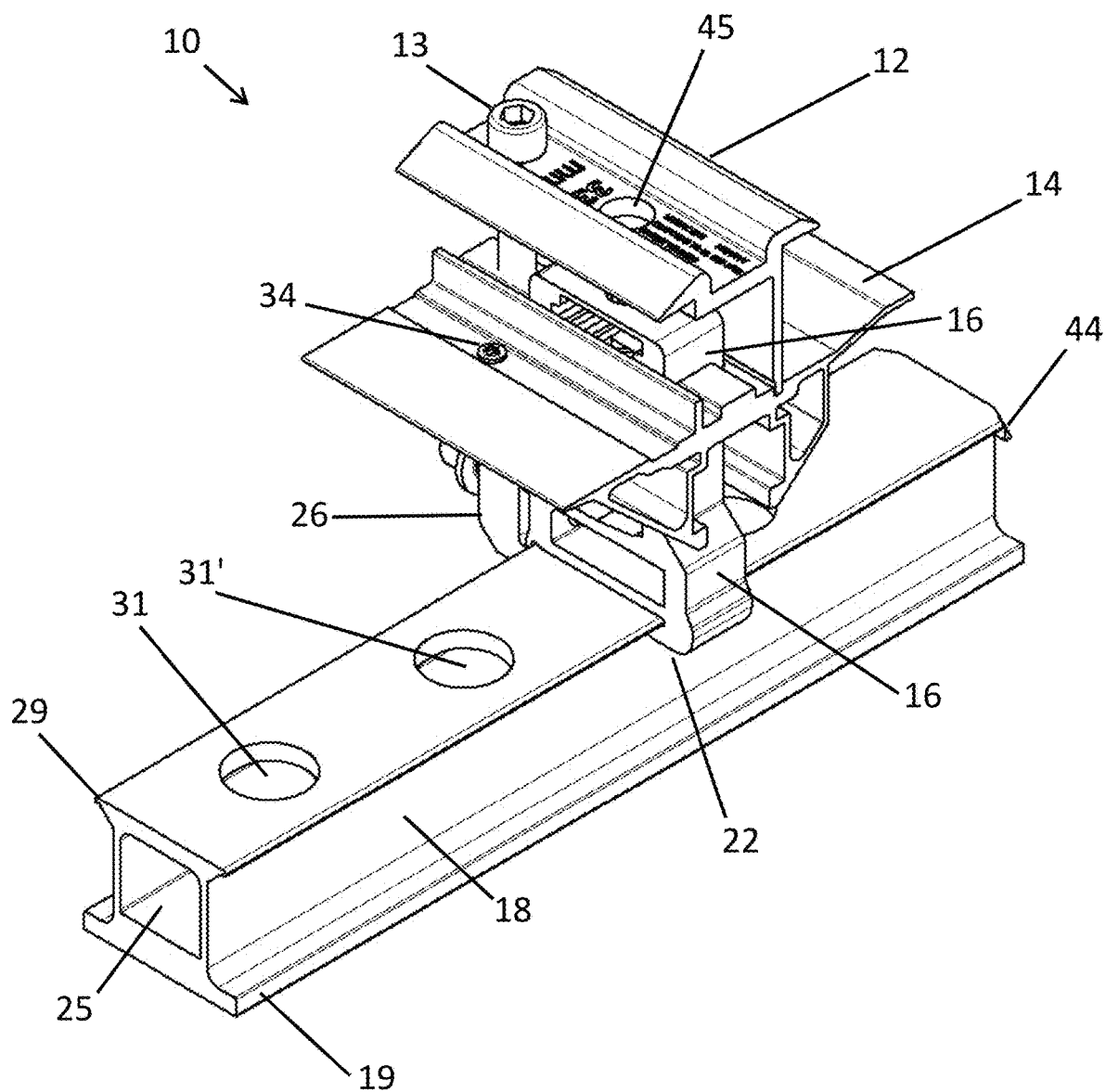
FIG. 4 shows a perspective view of an example of a click-on tower sub-assembly attached to a slider, with a height-adjustable solar panel mounting assembly mounted on the tower, according to the present invention.

FIG. 4 shows a perspective view of an example of a click-on tower sub-assembly attached to slider 18, with a height-adjustable, rail-less solar panel mounting assembly 10 mounted on tower 16, according to the present invention. Slider 18 comprises a plurality of access holes 31, 31', etc. for inserting lag screws (not shown) and screwing slider 18 down onto the roof surface 20 (See FIG. 1A). Slider 18 also comprises one or two deformed (turned-down) corner(s) 44 at one, or both, ends of slider 18 to prevent the clicked-on tower sub-assembly from accidently sliding off the end of slider 18 during installation. Grounding pin 34 is identified in this Figure. More details of a height-adjustable rail-less solar panel mounting assembly 10 can be found in a pending patent application U.S. Ser. No. 15/138,018, "Height-Adjustable Solar Panel Mounting Assembly", to Schuit et al., filed Apr. 25, 2016, which is incorporated herein by reference in its entirety. FIG. 4 additionally identifies the upper solar panel mounting bracket 12, the solar panel fastener 13, the lower solar panel mounting bracket 14, the tower 16, one bottom flange 19, the tower hook 22, the hollow volume 25, the clamp 26, the left slider lip 29, and an access hole 45, to be discussed later.

Figure 5:
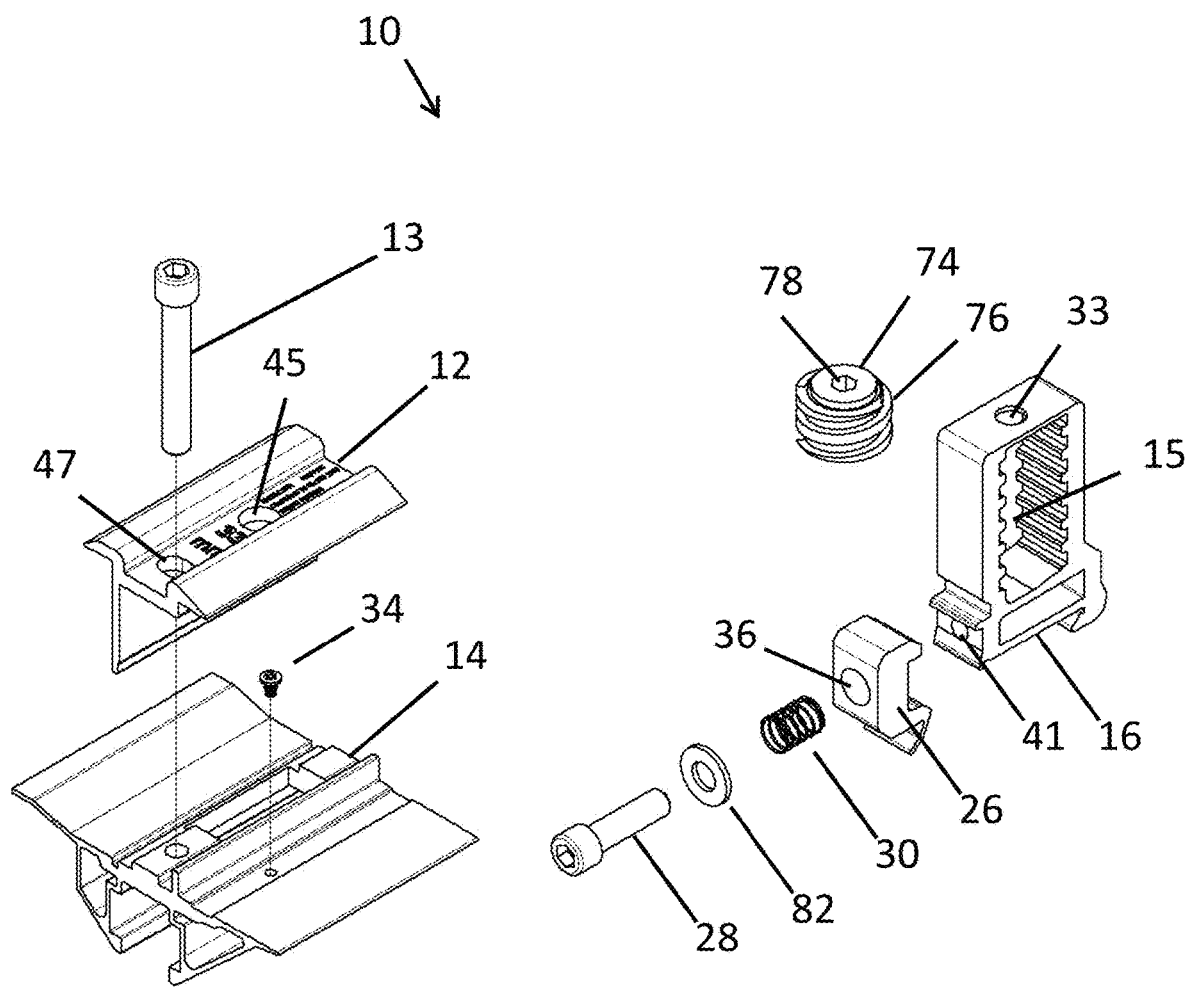
FIG. 5 shows an exploded perspective view of another example of a click-on tower sub-assembly next to a height-adjustable solar panel mounting assembly, according to the present invention.

FIG. 5 shows an exploded perspective view of another example of a click-on tower sub-assembly next to a height-adjustable, rail-less solar panel mounting assembly, according to the present invention. The clamp+tower subassembly 10 comprises clamp fastener 28, flat washer 82, spring 30, clamp 26, and tower 16. Helical drive 74 is inserted inside open volume 15 of tower 16, and comprises helical threads 76 and axially aligned hexagonal socket 78. Access hole 33 in the top of tower 16 aligns with hexagonal socket 78, and provides access for an Allen wrench to rotate helical drive 74 when the height is being adjusted. Also indicated in FIG. 5 are the upper solar power mounting bracket 12, the fastener 13, the lower solar power mounting bracket 14, the grounding pin 34, a second aperture 36 in the clamp 26, a hole 41 in the tower 16, an access hole 45, and a hole 47 permitting passage of the fastener 13.

Figure 6:
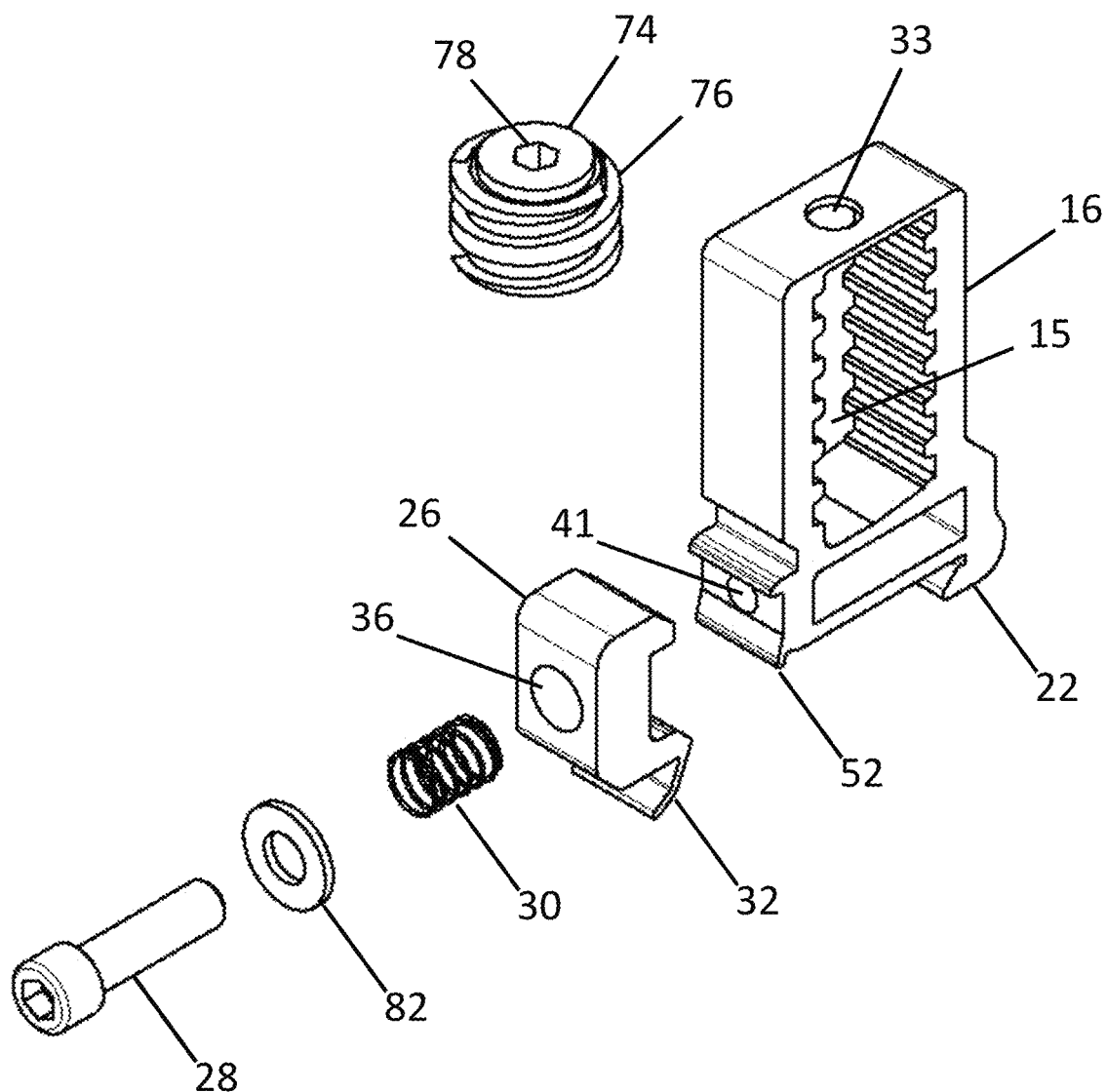
FIG. 6 shows an exploded perspective view of another example of a click-on tower sub-assembly.

FIG. 6 shows an exploded perspective view of another example of a click-on tower sub-assembly. This figure shows an enlarged view of certain items shown and described previously in connection with FIG. 5; a repetitive description of those items is not unnecessarily provided here.

Figure 7:
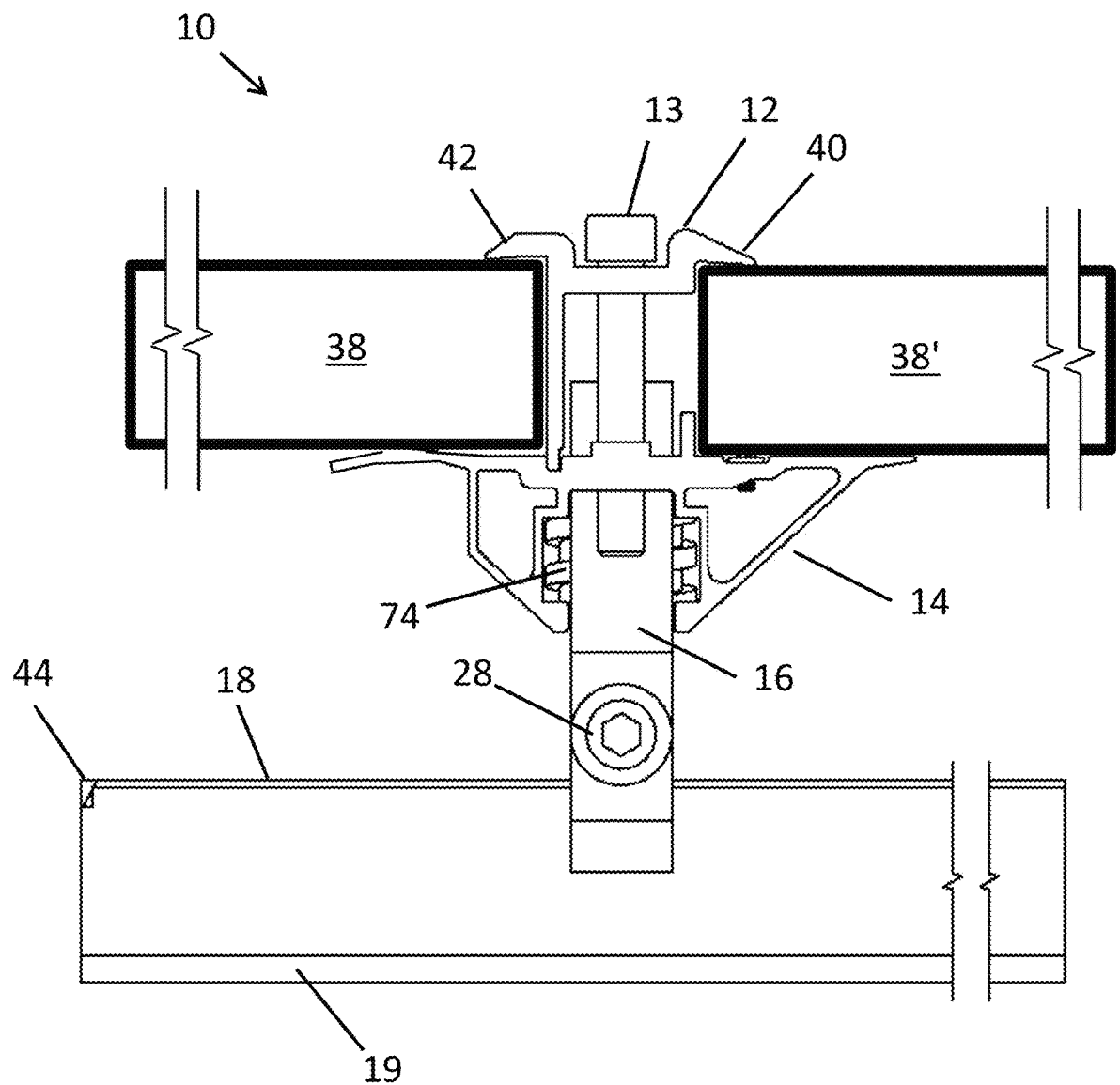
FIG. 7 shows an elevation end view of another example of a click-on tower sub-assembly attached to a slider, with a height-adjustable solar panel mounting assembly mounted on the tower, according to the present invention.

FIG. 7 shows an elevation end view of another example of a click-on tower sub-assembly attached to a slider 18, with a height-adjustable, rail-less solar panel mounting assembly 10 mounted on tower 16, according to the present invention. Two solar panels 38 and 38' are mounted in-between (a) upper wings 40 and 42 of upper bracket 12, and (b) lower bracket 14. Fastener 13 clamps solar panels 38, 38' tight. Rotation of helical drive 74 moves the lower bracket 14 vertically up and down relative to fixed-height tower 16 (stanchion). This adjustment can be made before, or after, the solar panels 38, 38' have been mounted in assembly 10. The bottom flange 19, the clamp fastener 28, and a turned-down corner 44 of the slider 18 are also indicated in FIG. 7.

Figure 8:
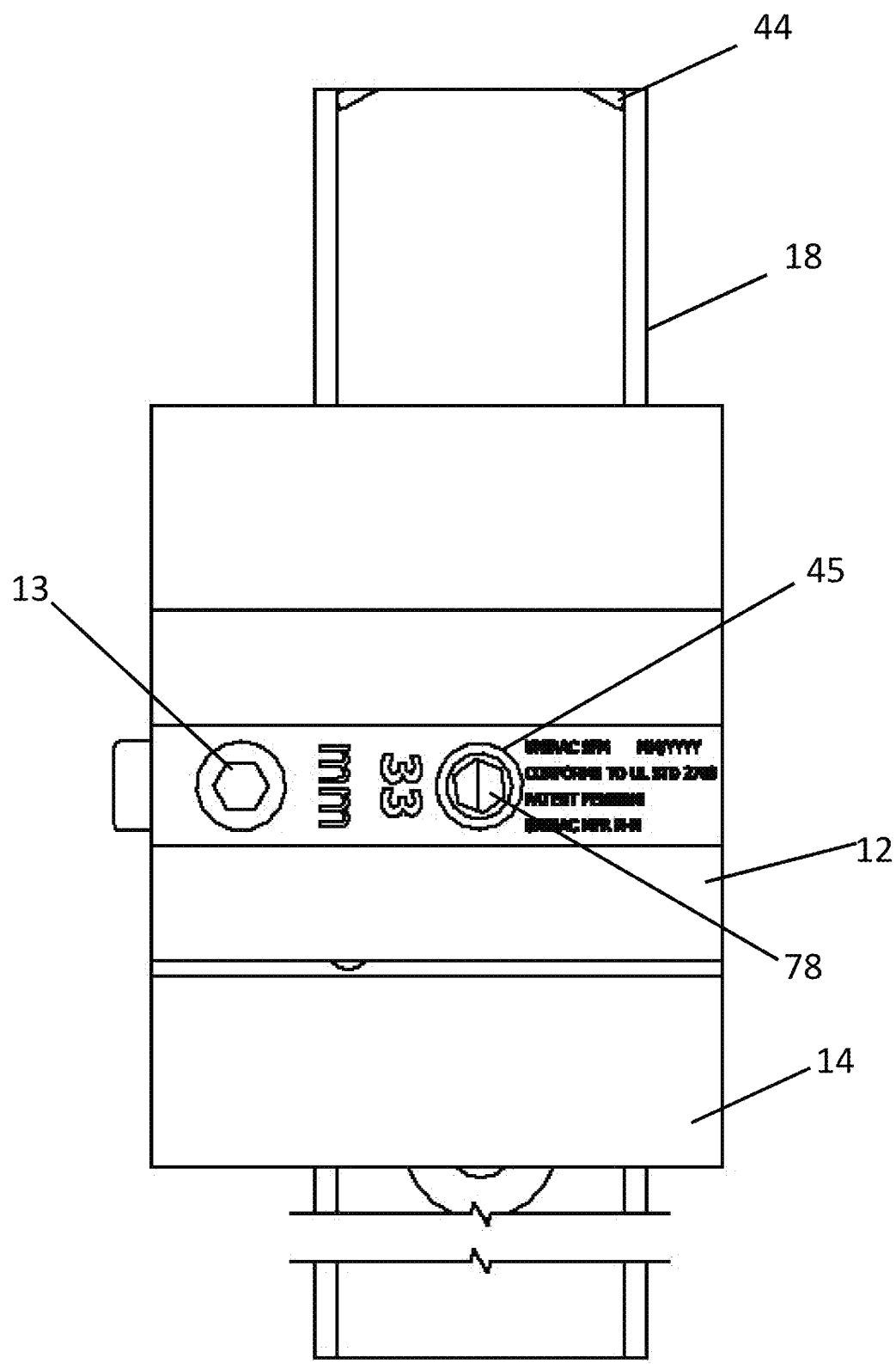
FIG. 8 shows a top view of another example of a click-on tower sub-assembly attached to a slider, with a height-adjustable solar panel mounting assembly mounted on the tower, according to the present invention.

FIG. 8 shows a top view of another example of a click-on tower sub-assembly attached to slider 18, with a height-adjustable solar panel mounting assembly mounted on the tower, according to the present invention. Access hole 45 provides access for an Allen wrench to drive the hexagonal socket hole 78 in a helical drive (configured in the same way as the drives 74 shown in FIGS. 5-7). Additionally indicated in FIG. 8 are the upper and lower solar panel mounting brackets 12 and 14, the fastener 13 used to compress the brackets 12 and 14 together, and the corner 44 previously mentioned.

Figure 9:
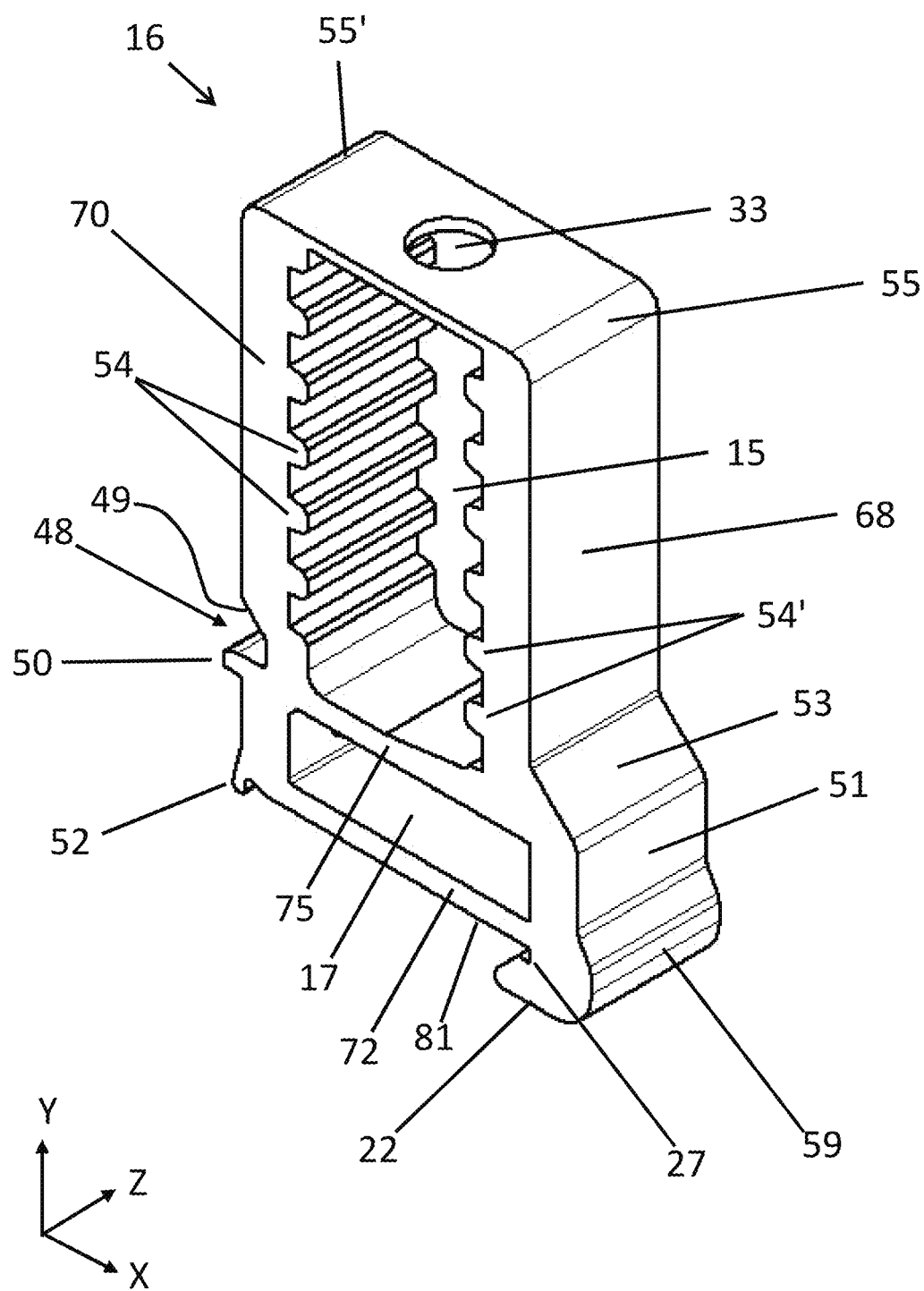
FIG. 9 shows a perspective view of an example of a tower.

FIG. 9 shows a perspective view of an example of a tower. Tower 16 is asymmetric, with a bottom hook 22 and notch 27 on the right side; a lower lip 52 on the left side; and connecting web segments 72 and 75 disposed in-between the two sides. Tower 16 comprises two open volumes 15 and 17, separated by a second connecting web segment 75. Tower 16 comprises two parallel sidewalls 68 and 70, with each sidewall comprising a set of parallel, spaced-apart teeth 54 and 54' that engage threads 76 of a helical drive (similar to the drives 74 shown in FIGS. 5-8). An external notch 48 is disposed on the outside of left sidewall 70, with notch 48 comprising a side flange 50 and a slanted face 49 (which can be slanted at 45°, for example). The right part of sidewall 68 comprises a pair of asymmetric features: (a) a sloped/slanted shoulder 53 and (b) a lateral offset 51 in sidewall 68. Downwardly-protruding lip 52 is disposed on the lower left hand corner of tower 16, which serves to properly align the tower 16 when clicked-on to slider 18. Outside (external) notch 48 engages the upper lip 58 of clamp 26 (See FIGS. 13 and 14). Tower 16 has rounded upper corners 55 and 55', and a rounded lower right-hand corner 59. The access hole 33 and the lower surface 81 of the tower 16 are also indicated in FIG. 9.

Figure 10:
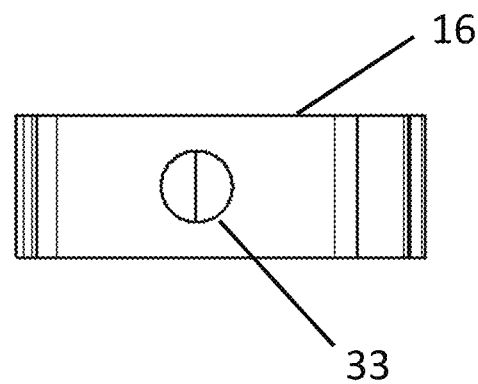
FIG. 10 shows a top view of an example of a tower.

FIG. 10 shows a top view of an example of a tower 16, showing the access hole 33.

Figure 11:
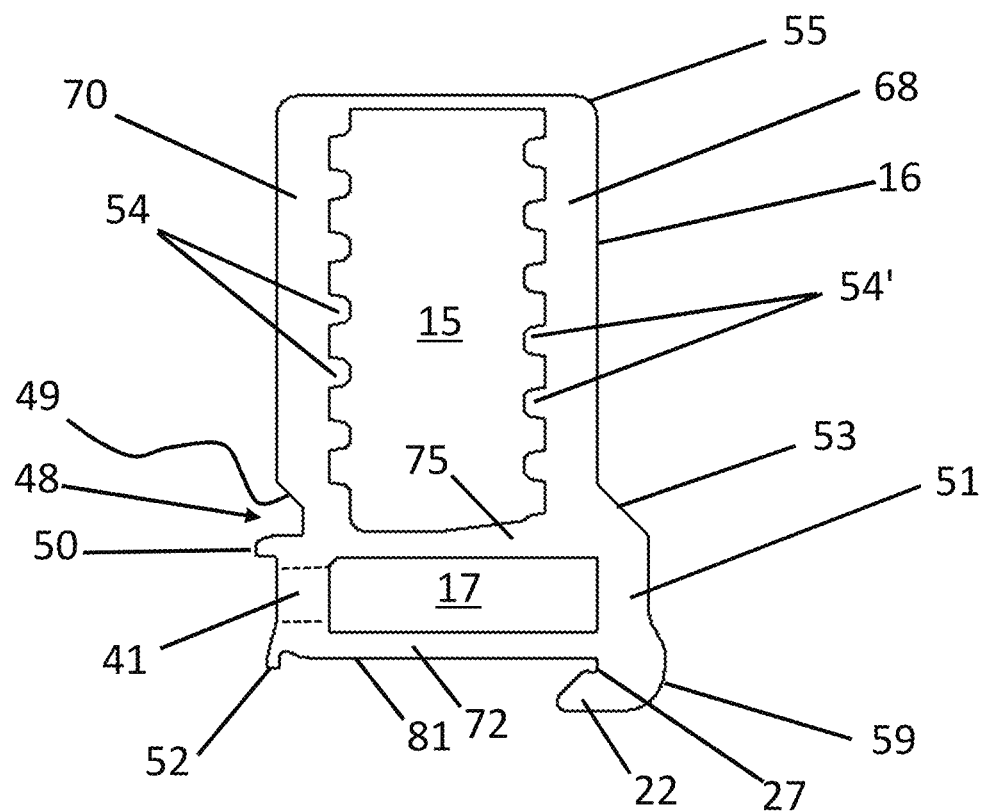
FIG. 11 shows a front elevation view of an example of a tower.

FIG. 11 shows a front elevation view of an example of a tower 16. The detailed description of FIG. 11 is the same as that of FIG. 9. Threaded hole or aperture 41 is disposed in the left sidewall 70 of tower 16, which receives the clamp fastener 28 mentioned previously. Alternatively, hole 41 can be smooth (un-threaded), in which case fastener 28 can be a threaded machine bolt with a nut (not shown) on the distal end.

Figure 12:
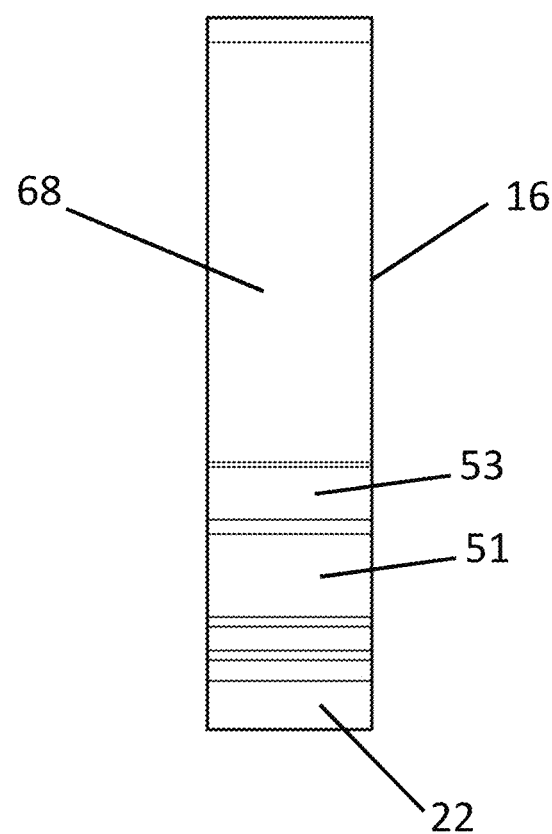
FIG. 12 shows a side elevation view of an example of a tower.

FIG. 12 shows a side elevation view of an example of a tower 16, in which the hook 22, the lateral offset 51, the shoulder 53, and the side wall 68 are indicated.

Figure 13:
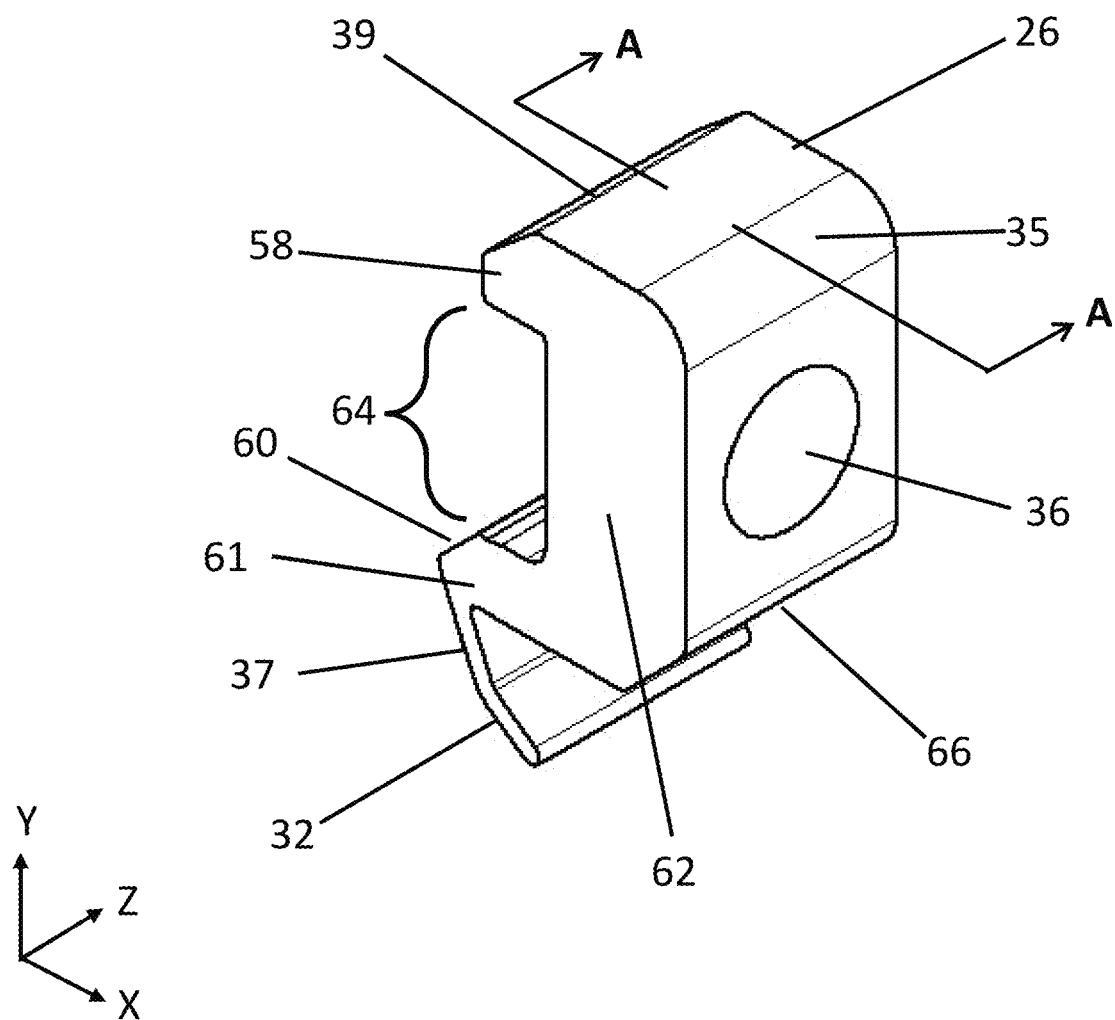
FIG. 13 shows a perspective view of an example of a clamp.

FIG. 13 shows a perspective view of an example of a clamp. Clamp 26 can be C-shaped, and can comprise a central body 62, upper lip 58, lower lip 61, central recess 64, central aperture 36 for passing fastener 28 through, lower angled flange 32 and 37, upper slanted face 39, lower slanted face 60, rounded upper corner 35, and slanted or rounded lower corner 66. Central recess 64 provides for clamp 26 to be a dovetail type of lock when clamping tower 16 to slider 18, and the lower slanted face 60 provides for a clamping force component in the vertical direction that serves to compress tower 16 onto slider 18 when the clamp fastener 28 is tightened tight. Clamp 26 can be a machined or extruded or 3-D printed part; made of aluminum, aluminum alloy, anodized aluminum or aluminum alloy, or steel.

Figure 14:
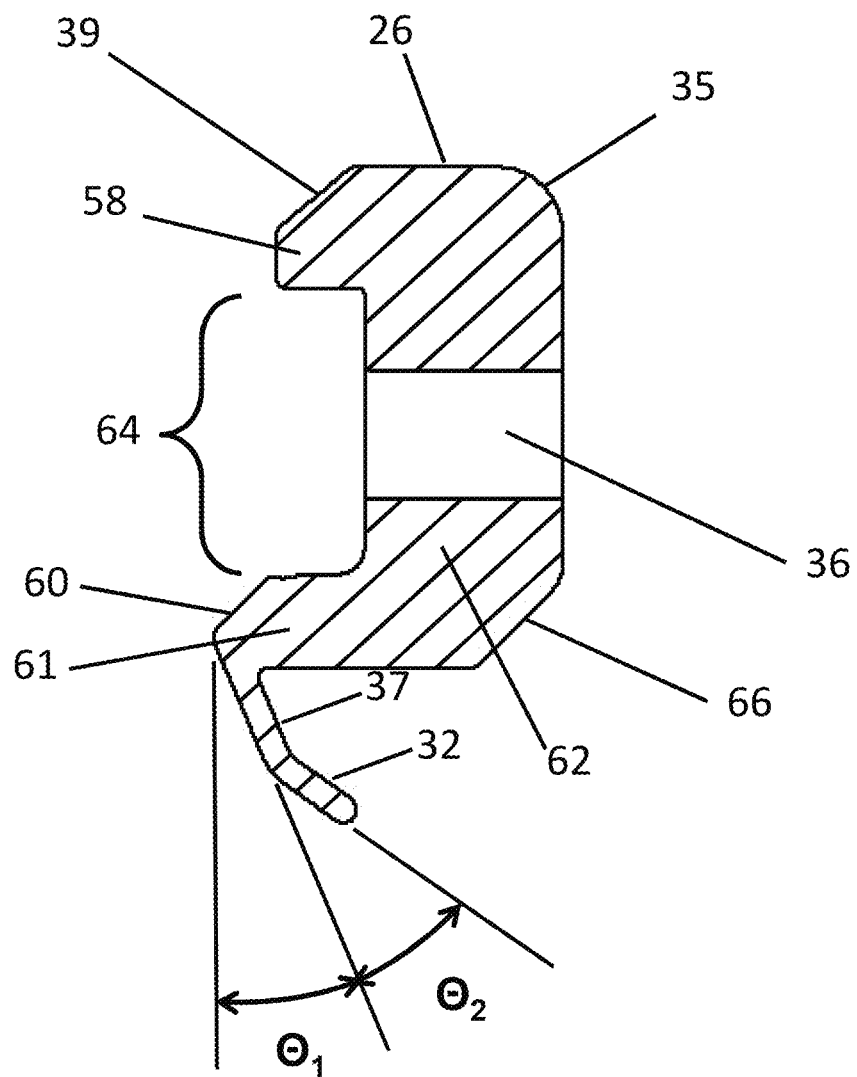
FIG. 14 shows a cross-section (SEC. A-A) front elevation view of an example of a clamp.

FIG. 14 shows a cross-section (SEC. A-A in FIG. 13) front elevation view of an example of a clamp. In this view, the lower angled flange comprises two segments: (1) an upper segment 37 angled at $\theta_1$, and (2) a lower segment 32 angled at the same, or a different, angle, $\theta_2$. In the present example, both of these angles, $\theta_1$ and $\theta_2$, can be about 30°.

Figure 15:
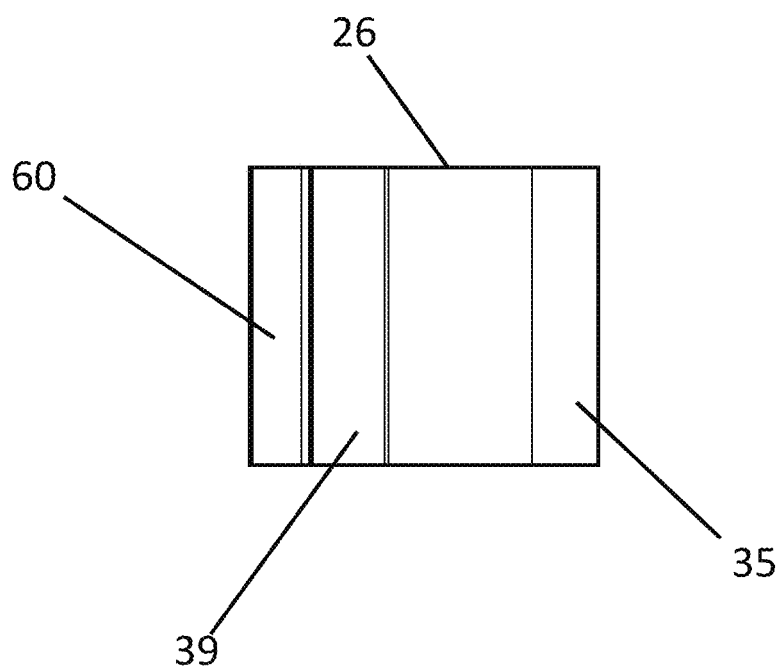
FIG. 15 shows a top view of an example of a clamp.

FIG. 15 shows a top view of an example of a clamp 26, in which the rounded upper corner 35, the upper slanted face 39, and the lower slanted face 60 are identified.

Figure 16:
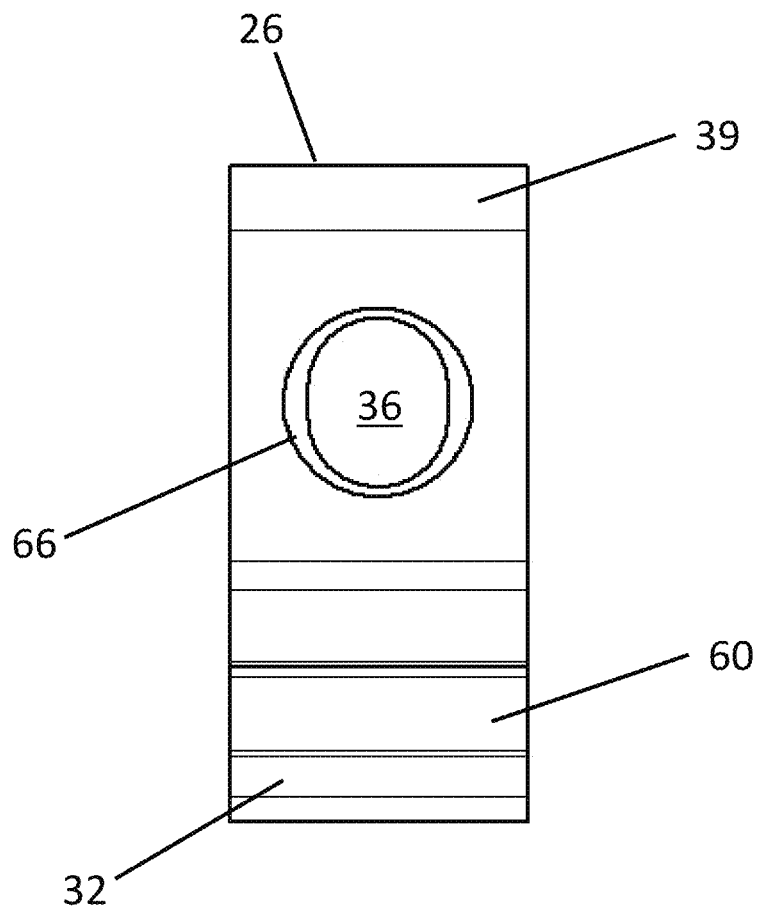
FIG. 16 shows an end elevation view of an example of a clamp.

FIG. 16 shows an end elevation view of an example of a clamp. Clamp 26 has an oval aperture 36, which provides clearance for clamp fastener 28. Aperture 36 is longer vertically than it is wide horizontally, which provides clearance and accommodates out-of-plane rotation of clamp 26 during the process of clicking-on (i.e., latching) the clamp+tower sub-assembly to slider 18. Recess 64 is machined as a recessed ledge in clamp 26 in order to hold the distal end of coil spring 30 (shown, for example, in FIGS. 1A-1B and 5-6). The flange 32, the face 39, and the mating surface 60 mentioned previously are also indicated.

Figure 17:
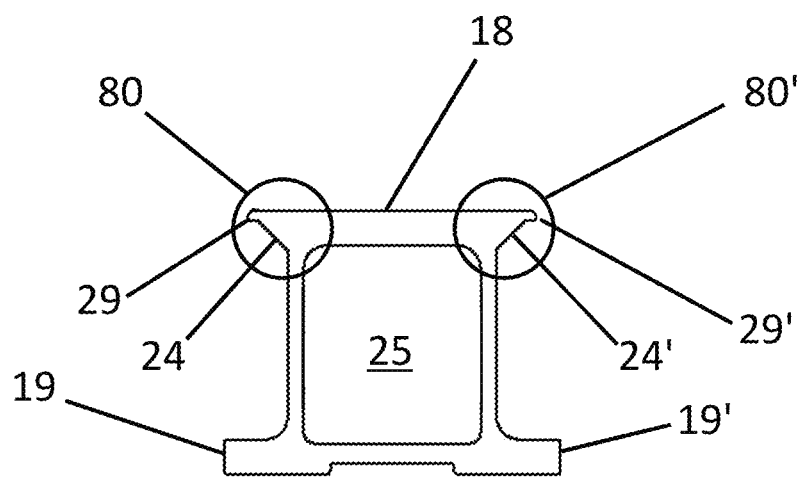
FIG. 17 shows an end elevation view of an example of a slider.

FIG. 17 shows an end elevation view of an example of a slider. Slider 18 comprises a hollow, rectangular channel with bottom flanges 19, 19' and hollow volume 25 in the center. On the two upper corners of slider 18 are external flanges 80 and 80', which comprise lips 29 and 29', and slanted faces 24 and 24', respectively. The slanted face 24 of flange 80 engages with the slanted face 60 of lower lip 61 of clamp 26; and the slanted surface 24' of flange 80' engages with the slanted face 21 of hook 22 on tower 16.

A first example of a method of attaching a click-on tower 16 to a slider 18 can comprise the following steps:
  a) providing a threaded fastener 28;
  b) providing a tower 16 defining a first threaded hole or aperture 38 for receiving the threaded clamp fastener 28, wherein the tower 16 comprises a hook 22 on a bottom surface of the tower 16;
  c) providing a clamp 26 defining a second aperture 36 for passing the fastener 28 through;
  d) providing spring biasing means 30 for urging the clamp 26 towards the tower 16 along the fastener 28; and
  e) mounting a slider bar 18 to a roof with lag screws;
  f) inserting the spring biasing means 30 over the threaded clamp fastener 28; then
  g) inserting the clamp 26 over the threaded clamp fastener 28; then
  h) partially threading the fastener 28 into the first threaded hole or aperture 38 of the tower, whereas the clamp 26 can move freely back and forth along the threaded clamp fastener 28, to make a clamp+tower sub-assembly;
  i) attaching the slider 18 to a roof 20 using at least one lag screw;
  j) placing the tower's hook 22 on a first slanted flange 80' of the slider 18;
  k) rotating the clamp+tower sub-assembly down to a horizontal position and clicking-on the clamp 26 to a second slanted flange 80 of the slider 18; and
  l) locking the clamp 26 to both the tower 16 and the slider 18 by tightening the threaded fastener 28, whereby the tower 16 becomes securely attached to the slider 18.

A second method for removably mounting a click-on tower 16 to a slider 18 can comprise the following steps:
  a) providing a clamp+tower subassembly 10 with a fastener 28 and a hook 22 on a bottom surface of the tower 16;

b) providing a slider 18;
c) engaging the hook 22 on a first slanted flange 80' of the slider 18;
d) rotating the sub-assembly 10 and then clicking-on a clamp 26 to a second slanted flange 80 of the slider; and
e) tightening the fastener 28, thereby locking the clamp 26 in a secure position.

Figure 18:
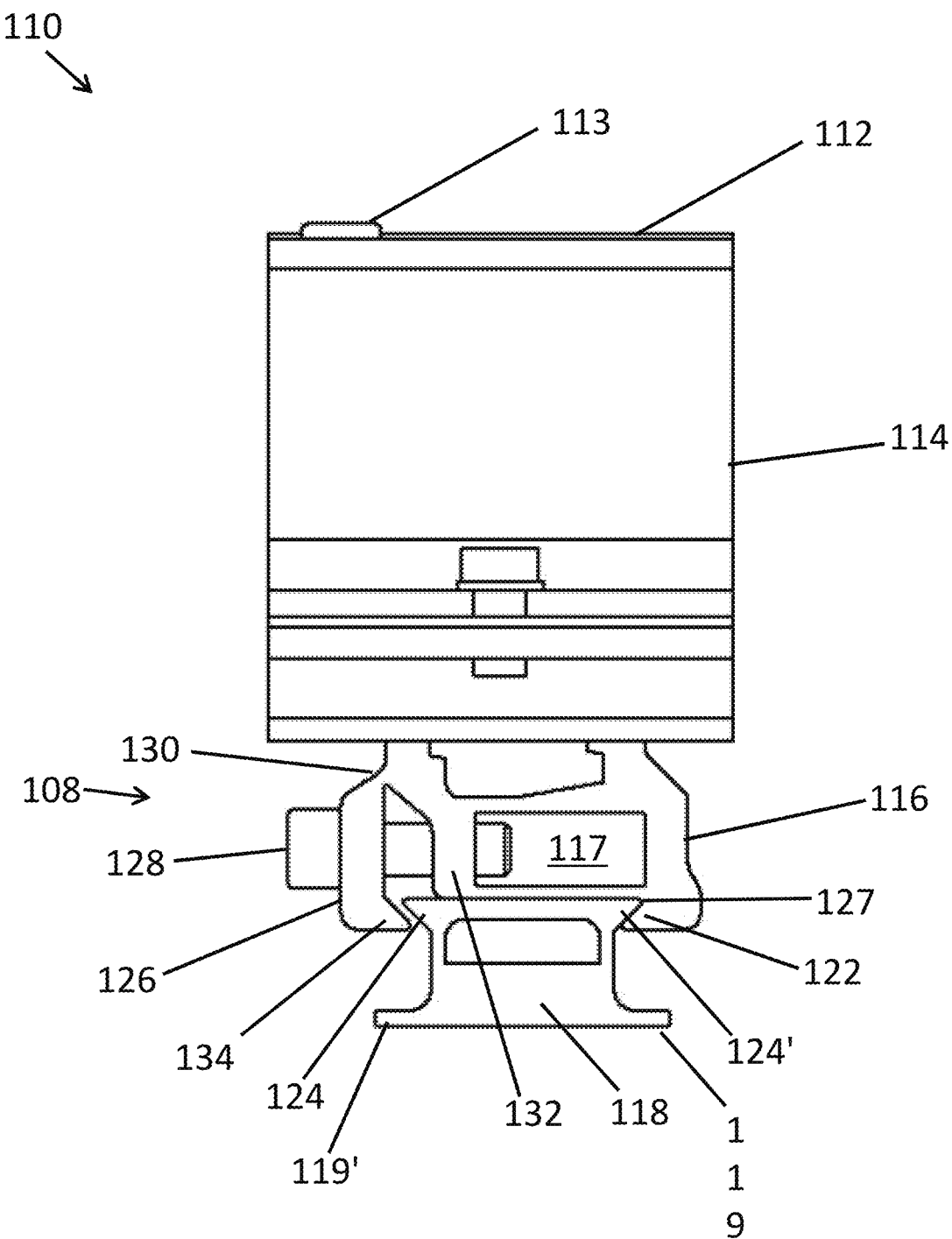
FIG. 18 shows a front elevation view of another example of a click-on tower sub-assembly attached to a slider, with a height-adjustable solar panel mounting assembly mounted on the tower, according to the present invention.

FIG. 18 shows a front elevation view of another example of a click-on clamp+tower sub-assembly 108 attached to a slider or slider bar 118, with a height-adjustable solar panel mounting assembly 110 mounted on a tower 116, according to the present invention. Here, asymmetric tower (stanchion) 116 has been hooked onto slider bar 118 by engaging notch 127 of tower hook 122 with slider lip of angled (tapered/slanted) slider flange 124'. Tapered flanges 124 and 124' can have angled (slanted) faces oriented at, for example, 45° to the horizontal. Fastener 128 is free to slide (translate) back and forth along clamp 126. In this example, upper solar panel mounting bracket 112 and lower solar panel mounting bracket 114 are attached to tower 116. Solar panel fastener 113 will be used to compress upper bracket 112 and lower bracket 114 together so as to mount and securely hold one or more solar panels (not shown) to tower 116 at a later stage in the installation process. Aperture 132 in tower 116 receives fastener 128. Aperture 132 can be threaded. Alternatively, aperture 132 can be unthreaded, and fastener 128 can be attached with a nut (not shown). Fastener 128 can be a threaded cap head screw.

FIG. 18 shows C-shaped clamp 126, which is attached on its upper half to tower 116 via thin web section 130. In this way, tower 116 and clamp 126 are one single, monolithic piece. Web section 130 is sufficiently thin so as to allow clamp 126 to easily flex (bend) back-and-forth with a spring-like, elastic action. When fastener 128 is tightened, the lower hook-end 134 of clamp 126 engages with slanted face of flange 124, which pulls the opposing hook-end of the lower hook 122 tight against the opposing slanted flange 124'. The horizontal position of clamp+tower subassembly 108 can be adjusted by sliding the clamp+tower subassembly 108 along the length of slider 118 prior to being locked into a secure position by tightening fastener 128. An open volume 117, and bottom flanges 119, 119', are also indicated in FIG. 18.

Figure 19:
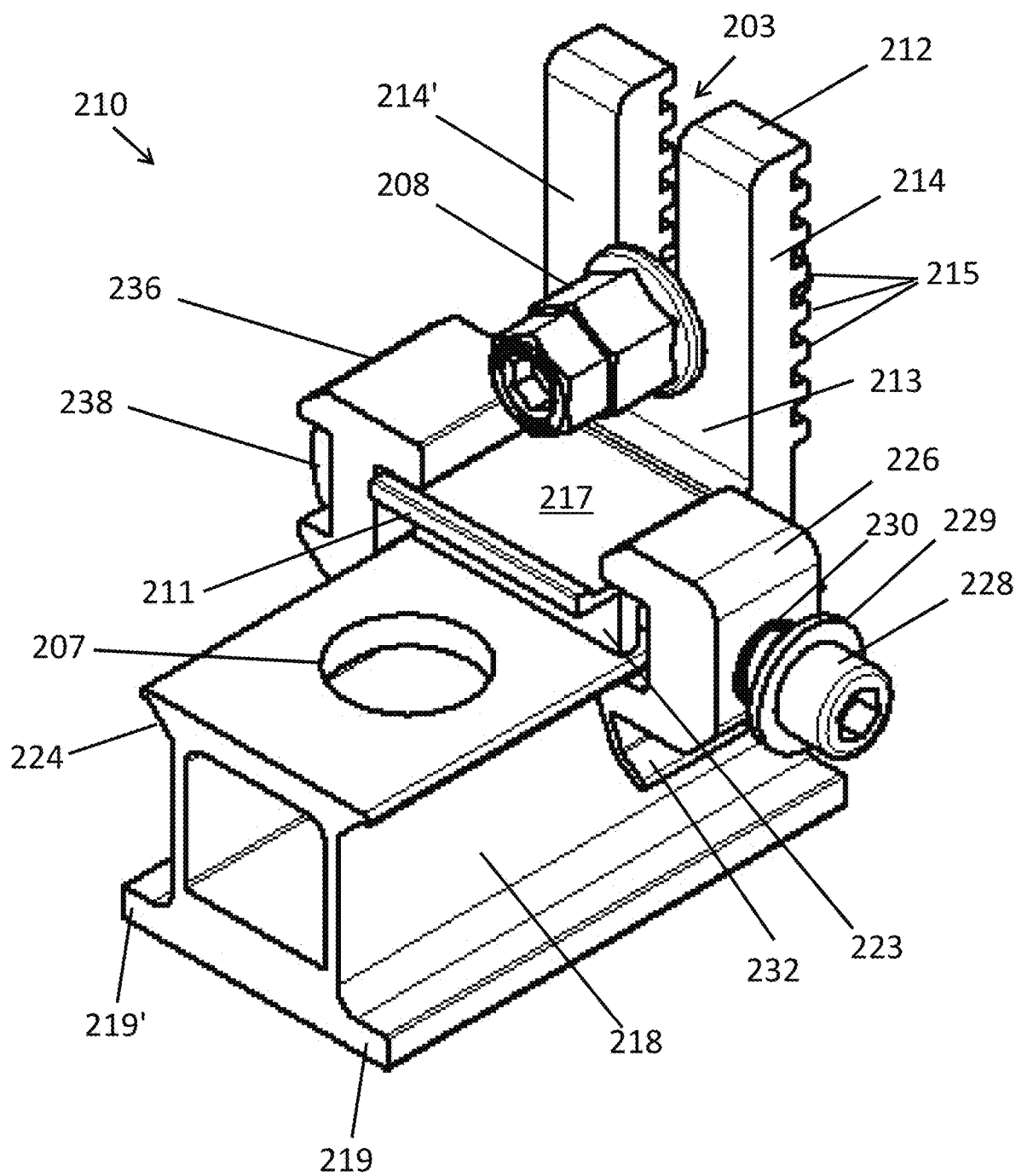
FIG. 19 shows a perspective view of an example of a click-on L-foot mount attached to a slider, according to the present invention.

FIG. 19 shows a perspective view of an example of an assembly 210 with a click-on L-foot mount 212 attached to a slider 218, according to the present invention. L-foot mount 212 comprises a monolithic, L-shaped structure with a horizontal base 217 made integral with an upright (vertical) mid-section 213 that is integrally joined to two, parallel upright sections 214 and 214', with an open slot 203 disposed down the middle between the two upright sections 214 and 214'. On two distal vertical faces of the two upright sections 214 and 214' of L-foot mount 212 are a plurality of parallel, spaced-apart, horizontal teeth 215. The number of teeth can equal 8, for example. The teeth are used to engage horizontal edges of supporting members (not shown), such as solar mount rails that are used to support one or more solar panels. Horizontal base 217 can include a horizontal ledge 211 that serves to align side clamps 226 and 236 and a spacer 223 to contact the slider. Tri-drive nut 208 (which can be driven by three-different types of socket drives (one internal, and two external sockets)) can be used to attach these supporting members to L-foot mount 212.

Figure 20:
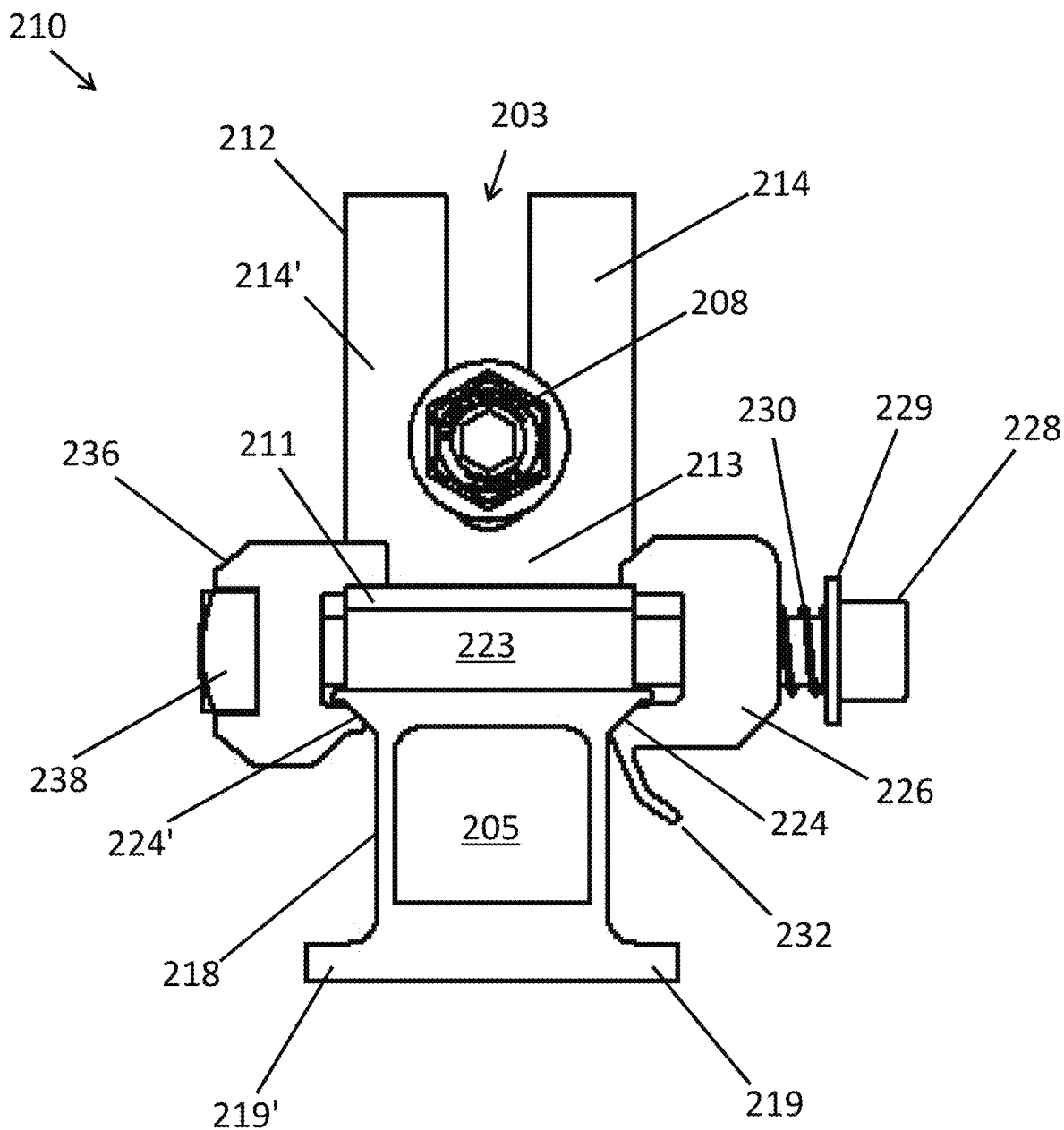
FIG. 20 shows a front elevation view of an example of a click-on L-foot mount attached to a slider, according to the present invention.

In FIG. 19, L-foot mount 212 is clamped onto slider 218 with a pair of C-shaped clamps 226 and 236 that are compressed with fastener 228, which can be a threaded cap screw and a nut 238 (see FIG. 20). Alternatively, receiving clamp 236 can have a threaded aperture for receiving a distal end of fastener 228. Biasing means 230 can be disposed in-between clamp 226 and the head of fastener 228. A flat washer 229 can be disposed in-between the biasing means 230 and head of fastener 228. Biasing means 230 can be, for example, a coil spring, stacked Bellevue washers, angled tabs, leaf spring, elastic band, or combinations thereof. Also identified in FIG. 19 are an access hole 207, operating similarly to the access holes 31, 31' referred to previously, bottom slider flanges 219, 219', an angled slider flange 224, and a lower flange 232 of the side clamp.

FIG. 20 shows a front elevation view of an example of a click-on L-foot mount 212 attached to a slider 218, according to the present invention. L-foot mount 212 is clamped onto slider 218 with a pair of C-shaped clamps 226 and 236 that are held together (compressed) with the fastener 228, which, again, can be the threaded cap screw and the nut 238. Clamp 226 "clicks-on" L-foot mount 212 to slider 218 with a "clicking" sound that is made when spring 230 forces/urges lower angled face 224 of clamp 226 to make contact with slider 218 at angled face 224. The engagement of flange 232 with slider 218 facilitates the transverse displacement of clamp 226 on fastener 228 when L-mount 212 is rotated into position on slider 218 from an initial skew angle of about 20°-30° (See FIG. 1A). A hollow volume 205, configured similarly to the hollow volume 25 described previously, is shown, as are various other elements that have already been identified and that are not discussed unnecessarily here.

Figure 21:
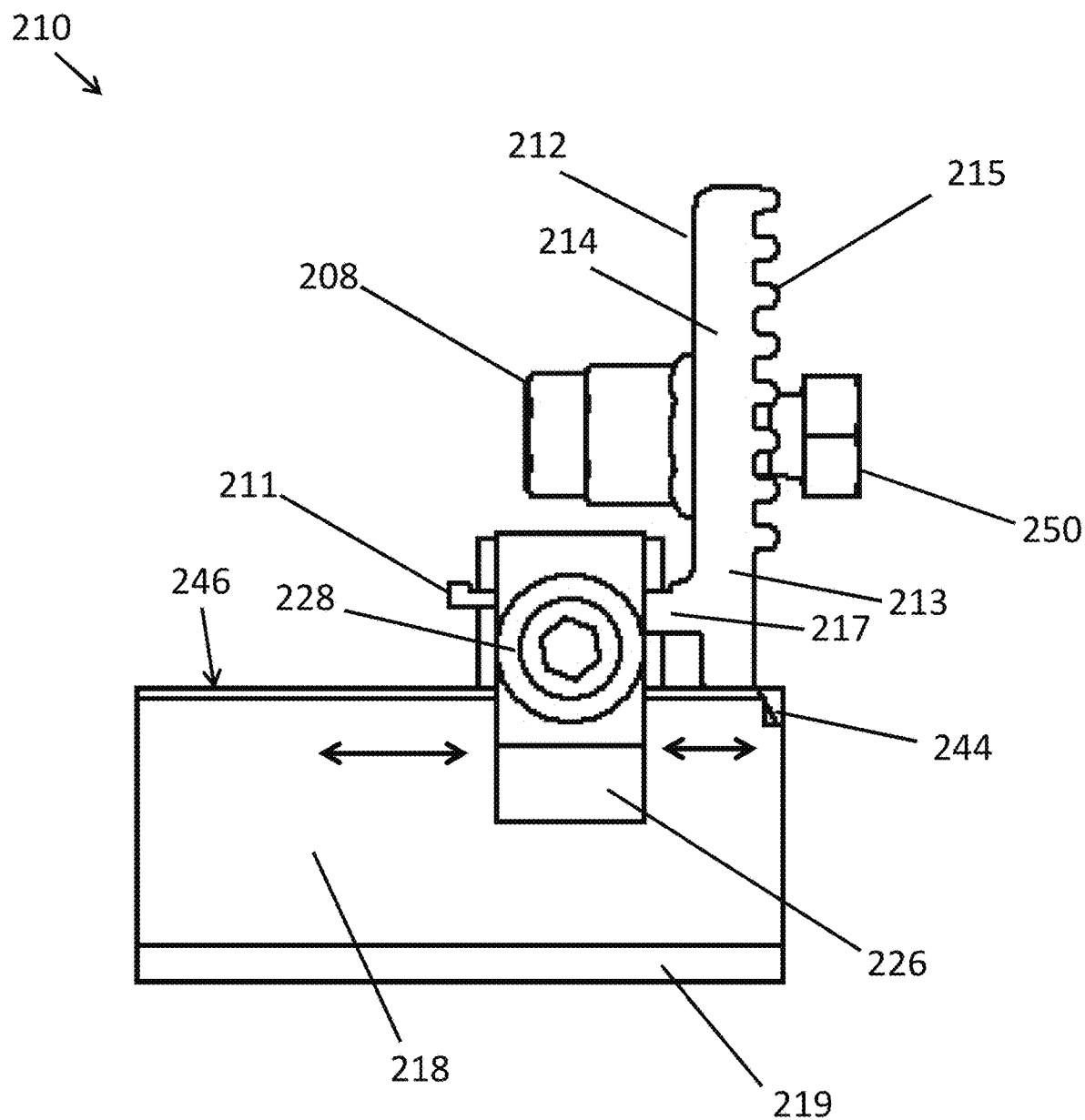
FIG. 21 shows a side elevation view of an example of a click-on L-foot mount attached to a slider, according to the present invention.

FIG. 21 shows a side elevation view of an example of an assembly 210 with a click-on L-foot mount 212 attached to a slider, according to the present invention. Attachment bolt 250 engages with tri-drive nut 208 (which can be a standard nut, optionally). L-foot mount 212 further comprises a first upright leg section 219 disposed on the bottom of mid-section 213, which touches the upper surface 246 of slider 218. A second upright leg section (not shown) is disposed behind clamp 226, which can't be seen in this view. The position of clamp 226 (with L-foot mount 212 and clamp 236, shown in FIGS. 22-23) can be adjusted by sliding them back-and-forth along the length of slider 218, as indicated by the double-headed arrows in FIG. 21, prior to being securely clamped and locked into its final position by tightening fastener 228. The slider shown in FIG. 21 also includes a deformed (turned-down) corner 244, similar to the corner 44 mentioned previously, and other elements that have already been identified and that are not discussed unnecessarily here.

Figure 22:
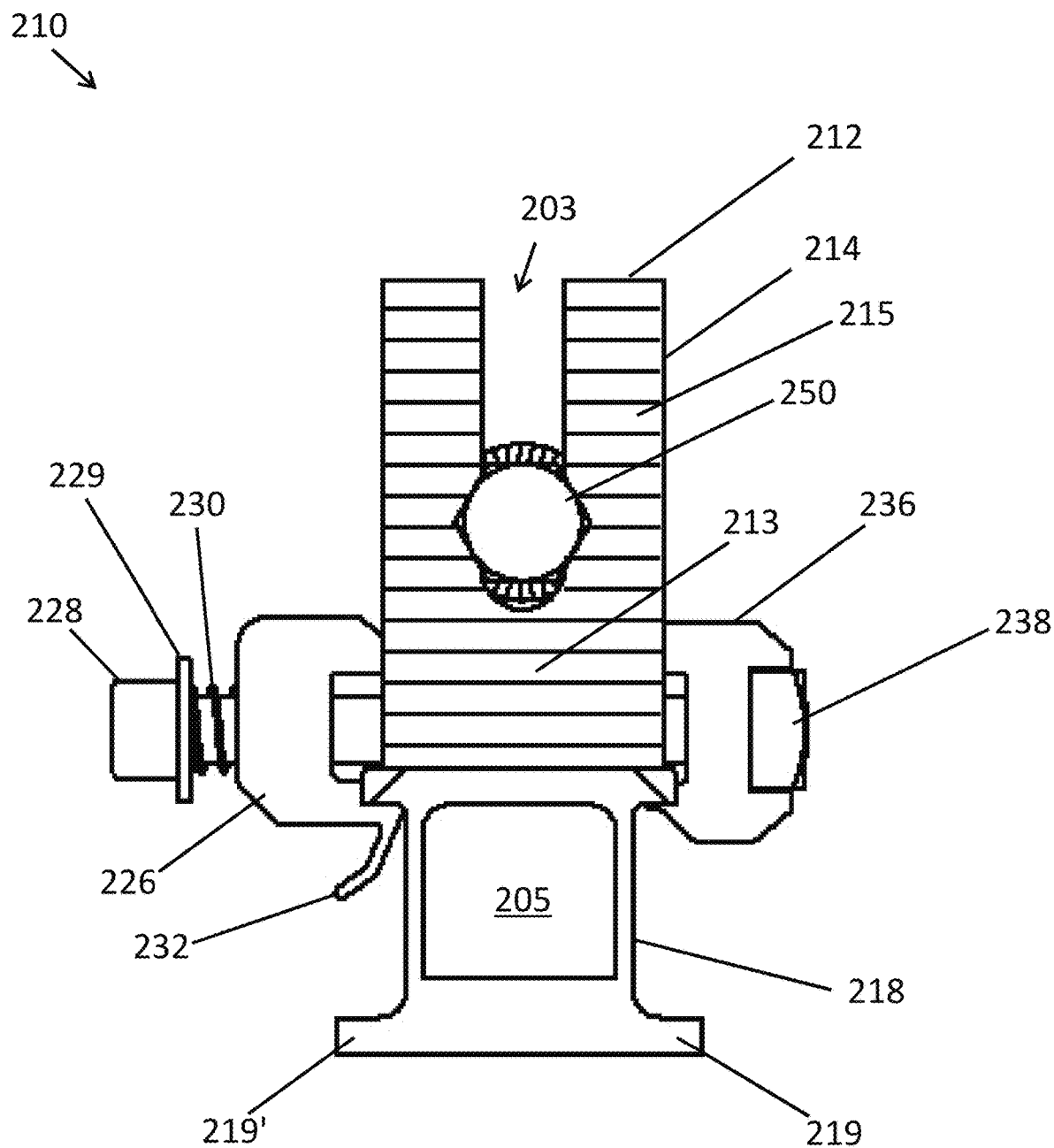
FIG. 22 shows a rear elevation view of an example of a click-on L-foot mount attached to a slider, according to the present invention.

FIG. 22 shows a rear elevation view of an example of a click-on L-foot mount attached to a slider, according to the present invention. The assembly 210 shown includes various elements that have already been identified and that are not discussed unnecessarily here.

Figure 23:
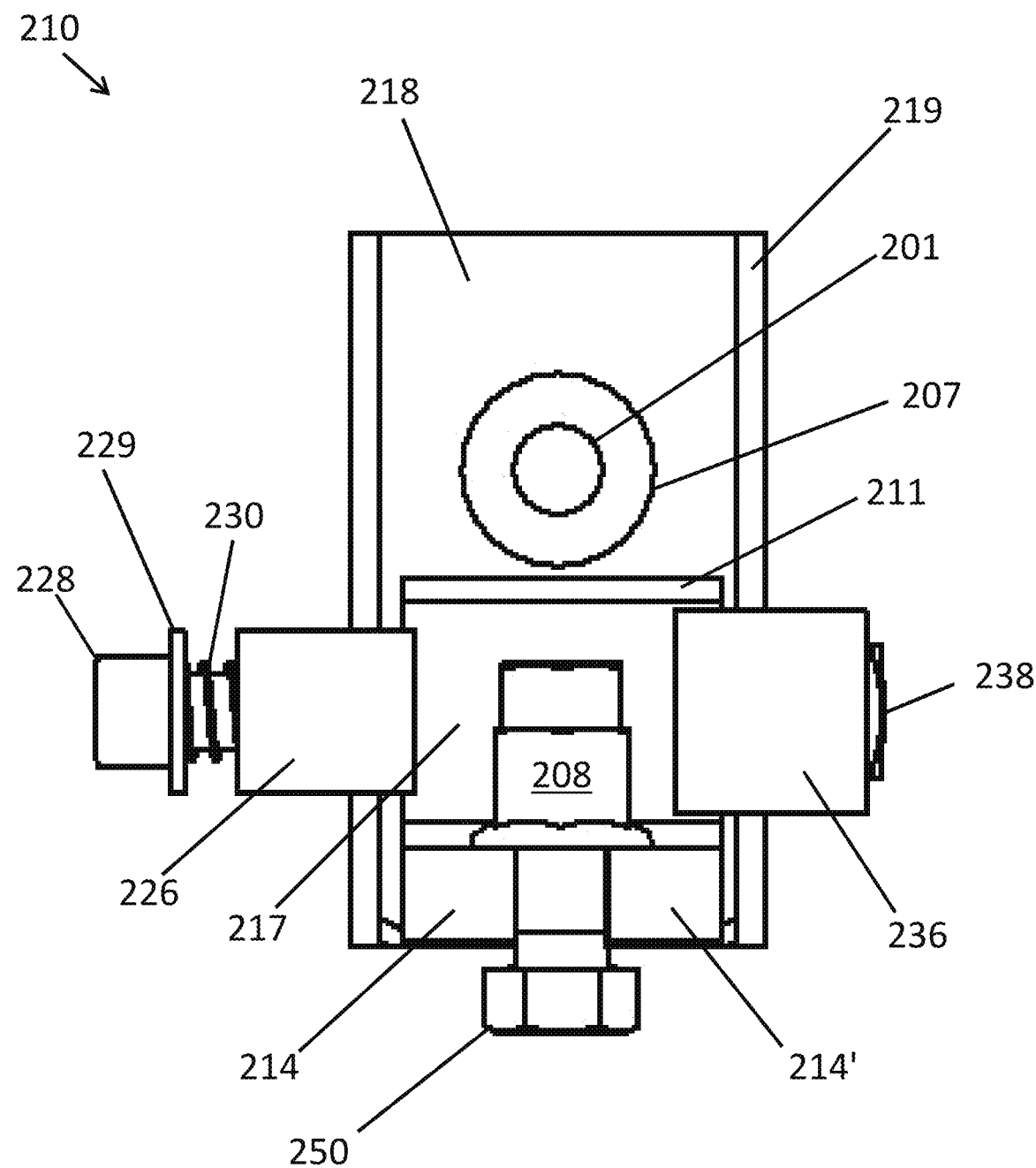
FIG. 23 shows a top plan view of an example of a click-on L-foot mount attached to a slider, according to the present invention.

FIG. 23 shows a top plan view of an example of the assembly 210 with a click-on L-foot mount attached to a slider, according to the present invention. Slider 218 has a through-hole 201 for inserting a lag screw (not shown) used for mounting slider 218 onto a roof. FIG. 23 also shows various elements that have already been identified and that are not discussed unnecessarily here.

The foregoing disclosure has been set forth merely to illustrate the invention and is not intended to be limiting. Since modifications of the disclosed embodiments incorporating the spirit and substance of the invention may occur to persons skilled in the art, the invention should be considered to include everything within the scope of the appended claims and equivalents thereof.

What is claimed is:

1. An assembly for mounting solar panels on a roof, comprising:
a sub-assembly, including:
a fastener;
a tower including:
a first aperture defined therein for receiving the fastener; and
a hook formed at a first end of the tower; and
a clamp including a second aperture defined therein for passing the fastener through;
wherein:
the fastener directly interfaces with the clamp to attach the clamp to the tower,
the sub-assembly is removably coupled to a slider by the hook and by the clamp located at a second end of the tower,
the clamp is C-shaped, the clamp including:
a central body;
an upper lip;
a lower lip;
a central recess defined in the clamp;
an angled flange; and
a slanted face.

2. The assembly claim 1, wherein:
the first aperture defined in the tower is threaded, and the fastener is a threaded bolt, or
the first aperture defined in the tower is un-threaded, and the threaded bolt includes a nut on a distal end of the threaded bolt.

3. The assembly of claim 1, wherein the hook has a slanted surface that is engaged with a slanted surface of a flange of the slider.

4. The assembly of claim 3, wherein the hook further includes a notch that engages with a lip of the flange of the slider.

5. The assembly of claim 1, further comprising a slider, the slider including:
a first flange having a slanted surface; and
a second flange having a slanted surface, and
wherein an angled flange of the clamp is engaged with the slanted surface of the second flange, which is formed on the slider opposite the first flange of the slider.

6. The assembly of claim 3, wherein the tower further includes a lower alignment lip that protrudes past a bottom surface of the tower on a side opposite from the hook.

7. The assembly of claim 1, wherein the tower further includes an external notch that engages with an upper lip of the clamp.

8. The assembly of claim 5, wherein, when the fastener is tightened against the clamp, the clamp holds the tower against the slider on a second flange of the slider and the hook securely holds the tower against the slider on the first flange of the slider.

9. The assembly of claim 1, further comprising a biasing means located between the fastener and the clamp for biasing the clamp towards the tower along the fastener.

10. The assembly of claim 9, wherein the biasing means includes at least one of a coil spring, stacked Bellevue washers, angled tabs, a leaf spring, and an elastic band.

11. The assembly of claim 9, wherein:
the biasing means includes a coil spring, and
the sub-assembly further includes a washer disposed on the fastener and next to the coil spring.

12. The assembly of claim 11, wherein the clamp includes a recessed ledge for receiving and holding the coil spring.

13. The assembly of claim 1, wherein the clamp is attached to the tower via a flexible web section.

14. The sub-assembly of claim 1, wherein the first aperture defined in the tower is threaded, and the fastener is a threaded bolt.

15. An assembly for mounting solar panels on a roof, comprising:
a fastener;
a tower including:
a first aperture defined therein for receiving the fastener;
a clamp including a second aperture defined therein for passing the fastener through;
an upper bracket;
a lower bracket; and
a helical drive threadingly coupled to a plurality of parallel threads formed in an open volume defined within the tower,
wherein the fastener attaches the clamp to the tower,
wherein the upper bracket and the lower bracket are coupled to the tower by the helical drive and movable by rotation of the helical drive within the parallel threads of the tower, and
wherein the upper bracket and the lower bracket hold at least one solar panel disposed between the upper bracket and the lower bracket.

16. The assembly of claim 15, wherein the helical drive includes at least one helical thread that engages with the parallel threads.

17. The assembly of claim 15, wherein the upper bracket and the lower bracket are made of a single, monolithic part.

18. The assembly of claim 15, wherein the fastener is a first fastener, and
wherein the assembly further comprises a second fastener for clamping one or more solar panels between the upper bracket and the lower bracket.

19. The assembly of claim 18, further comprising a biasing means for urging the clamp towards the tower along the first fastener.

20. A tower for supporting a lower bracket of a solar panel mounting assembly, the tower comprising:
an extrusion including a first aperture defined therein;
a plurality of parallel threads formed on an interior surface of the first aperture defined within the extrusion;
an access hole defined at a top of the first aperture defined within the extrusion, the access hole providing access for a tool to rotate a helical drive threadingly coupled to the parallel threads;
a second aperture defined in a first side of the extrusion for receiving a fastener;
a clamp including a third aperture defined therein for passing the fastener through, the clamp including:
a body including a recess defined therein;
a first lip extending from the body to couple the clamp to the extrusion;
a second lip extending from the body to couple the extrusion to a slider; and
a flange extending from the second lip;
a hook formed on a second side of the extrusion opposite the second aperture defined in the first side of the extrusion; and
a biasing member to bias the clamp in an engaged state with the extrusion and the slider, wherein the flange allows the clamp to move around a protrusion of the slider.

21. The tower of claim 20, further comprising an alignment lip protruding from a first corner of a bottom surface of the extrusion, the alignment lip being disposed at the first corner located opposite from a second corner comprising the hook, the alignment lip protruding past the bottom surface of the extrusion.

22. The tower of claim 20, further comprising an external notch disposed on a first sidewall opposite from the second side of the extrusion including the hook.

23. The tower of claim 22, further comprising a slanted face formed inside the external notch.

24. An L-foot mount sub-assembly, comprising:
   an L-foot mount including:
      a horizontal base,
      a vertical portion integrated with the horizontal base, and
      a slot defined in the vertical portion, the slot forming a first vertical section and a second vertical section parallel to the first vertical section within the vertical portion,
   a fastener;
   a first clamp including a first aperture defined therein for passing the fastener through;
   a second clamp including a second aperture defined therein for passing the fastener through, the second clamp including means for capturing the fastener; and
   a biasing member to bias the first clamp and the second clamp towards a center of the L-foot mount and to allow the first clamp and the second clamp to move around a protrusion of a slider.

25. The L-foot mount sub-assembly of claim 24, wherein the means for capturing the fastener includes a nut.

26. The L-foot mount sub-assembly of claim 24, wherein the means for capturing the fastener includes a plurality of threads in the second aperture defined in the second clamp.

27. The L-foot mount sub-assembly of claim 24, further comprising a plurality of parallel, spaced-apart, horizontal teeth on distal vertical faces of the first vertical section and the second vertical section.

28. The L-foot mount sub-assembly of claim 24, further comprising a horizontal ledge to align the first clamp and the second clamp.

29. The L-foot mount sub-assembly of claim 24, further comprising a tri-drive nut and a bolt for attaching a component to the L-foot mount.

30. The L-foot mount sub-assembly of claim 24, further comprising a spacer disposed between the horizontal base and the slider, the spacer including a void defined therein through which the fastener is extended.

31. A mounting device, comprising:
   a tower including a hook formed on a first side of the tower, the hook to engage with a first protrusion of a slider;
   a clamp to couple the tower to the slider in opposition to the hook, the clamp being C-shaped and coupled on a second side of the tower opposite the first side, the clamp including:
      a central body;
      an upper lip;
      a lower lip;
      a central recess defined in the clamp;
      an angled flange; and
      a slanted face;
   a fastener directly interfacing with the clamp to fasten the clamp to the slider; and
   a biasing member to bias the clamp from the second side of the tower to the first side of the tower and to allow the clamp to move around a second protrusion of the slider.

32. The mounting device of claim 31, wherein the flange is formed at an angle on the clamp to compress the biasing member when the clamp is coupled to the slider.

33. The mounting device of claim 31, wherein the biasing member includes a flexible web section monolithically formed between the clamp and the tower to allow the clamp to flex around the second protrusion of the slider.

34. The mounting device of claim 31, wherein the biasing member includes a spring coupled to the fastener.

* * * * *